US010867314B2

(12) United States Patent
Kaehler

(10) Patent No.: US 10,867,314 B2
(45) Date of Patent: Dec. 15, 2020

(54) HEAD MOUNTED DISPLAY SYSTEM CONFIGURED TO EXCHANGE BIOMETRIC INFORMATION

(71) Applicant: Magic Leap, Inc., Plantation, FL (US)

(72) Inventor: Adrian Kaehler, Los Angeles, CA (US)

(73) Assignee: Magic Leap, Inc., Plantation, FL (US)

( * ) Notice: Subject to any disclaimer, the term of this patent is extended or adjusted under 35 U.S.C. 154(b) by 243 days.

(21) Appl. No.: 15/462,426

(22) Filed: Mar. 17, 2017

(65) Prior Publication Data

US 2017/0278122 A1      Sep. 28, 2017

Related U.S. Application Data

(60) Provisional application No. 62/311,745, filed on Mar. 22, 2016.

(51) Int. Cl.
*G06Q 30/02* (2012.01)
*G06K 9/00* (2006.01)
*G06F 21/32* (2013.01)
*G02B 27/01* (2006.01)

(52) U.S. Cl.
CPC ......... *G06Q 30/0217* (2013.01); *G06F 21/32* (2013.01); *G06K 9/0061* (2013.01); *G06K 9/00604* (2013.01); *G06K 9/00979* (2013.01); *G02B 27/017* (2013.01)

(58) Field of Classification Search
CPC ........... G06Q 30/0217; G06K 9/00604; G06K 9/0061; G06F 21/32
See application file for complete search history.

(56) References Cited

U.S. PATENT DOCUMENTS

| 6,850,221 B1 | 2/2005 | Tickle |
| 8,950,867 B2 | 2/2015 | Macnamara |
| 9,081,426 B2 | 7/2015 | Armstrong |
| (Continued) | | |

FOREIGN PATENT DOCUMENTS

WO     WO 2017/165231     9/2017

OTHER PUBLICATIONS

International Search Report and Written Opinion for PCT Application No. PCT/US2017/023037, dated May 25, 2017.
(Continued)

*Primary Examiner* — Katherine Kolosowski-Gager
(74) *Attorney, Agent, or Firm* — Knobbe, Martens, Olson and Bear, LLP

(57) ABSTRACT

Head mounted display systems configured to facilitate the exchange of biometric information between the head mounted display system and another computing device are disclosed. The head mounted display system can comprise a virtual or augmented reality device. After displaying a consent request regarding biometric information with the head mounted display system, a response to the consent request that includes a consent indication regarding an aspect of the biometric information can be determined. After obtaining biometric information from a wearer utilizing e.g., a camera of the head mounted display, and processing the biometric information, a biometric information processing result can be generated. The result can be communicated from the head mounted display system to another computing device.

20 Claims, 13 Drawing Sheets

(56) References Cited

U.S. PATENT DOCUMENTS

| | | | |
|---|---|---|---|
| 9,215,293 B2 | 12/2015 | Miller | |
| 9,310,559 B2 | 4/2016 | Macnamara | |
| 9,348,143 B2 | 5/2016 | Gao et al. | |
| D758,367 S | 6/2016 | Natsume | |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| 9,671,566 B2 | 6/2017 | Abovitz et al. | |
| 9,740,006 B2 | 8/2017 | Gao | |
| 9,791,700 B2 | 10/2017 | Schowengerdt et al. | |
| 9,851,563 B2 | 12/2017 | Gao et al. | |
| 9,857,591 B2 | 1/2018 | Welch et al. | |
| 9,874,749 B2 | 1/2018 | Bradski | |
| 2011/0098928 A1* | 4/2011 | Hoffman | A63B 71/0622 |
| | | | 702/5 |
| 2012/0127062 A1 | 5/2012 | Bar-Zeev et al. | |
| 2013/0082922 A1 | 4/2013 | Miller | |
| 2013/0125027 A1 | 5/2013 | Abovitz | |
| 2013/0286048 A1 | 10/2013 | Sternitzke | |
| 2013/0346168 A1 | 12/2013 | Zhou et al. | |
| 2014/0071539 A1 | 3/2014 | Gao | |
| 2014/0118225 A1 | 5/2014 | Jerauld | |
| 2014/0177023 A1 | 6/2014 | Gao et al. | |
| 2014/0218468 A1 | 8/2014 | Gao et al. | |
| 2014/0306866 A1 | 10/2014 | Miller et al. | |
| 2014/0337634 A1* | 11/2014 | Starner | H04L 9/3231 |
| | | | 713/186 |
| 2014/0341441 A1 | 11/2014 | Slaby et al. | |
| 2015/0016777 A1 | 1/2015 | Abovitz et al. | |
| 2015/0073907 A1* | 3/2015 | Purves | G06Q 20/32 |
| | | | 705/14.58 |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0235438 A1* | 8/2015 | Schowengerdt | G06T 13/40 |
| | | | 345/633 |
| 2015/0268415 A1 | 9/2015 | Schowengerdt et al. | |
| 2015/0302652 A1 | 10/2015 | Miller et al. | |
| 2015/0326570 A1* | 11/2015 | Publicover | G06F 21/64 |
| | | | 726/4 |
| 2015/0346490 A1 | 12/2015 | Tekolste et al. | |
| 2015/0346495 A1 | 12/2015 | Welch et al. | |
| 2016/0011419 A1 | 1/2016 | Gao | |
| 2016/0019360 A1* | 1/2016 | Pahwa | G06F 19/3418 |
| | | | 705/3 |
| 2016/0026253 A1 | 1/2016 | Bradski et al. | |

OTHER PUBLICATIONS

International Search Report and Corrected Written Opinion for PCT Application No. PCT/US2017/023037, dated Nov. 30, 2017.

International Preliminary Report on Patentability for PCT Application No. PCT/US2017/023037, dated Sep. 25, 2018.

European Extended Search Report, re EP Application No. 17770869.0, dated Sep. 3, 2019.

"In Conversation Jaron Lanier and James Bridle On Who Owns the Future," YouTube video available at https://www.youtube.com/watch?v=l4iSRXtsFLM, published on Apr. 20, 2015.

Partial transcript of "In Conversation Jaron Lanier and James Bridle On Who Owns the Future," YouTube video available at https://www.youtube.com/watch?v=l4iSRXtsFLM, published on Apr. 20, 2015, from time 49:09 to 50:40.

* cited by examiner

HEAD MOUNTED DISPLAY SYSTEM CONFIGURED TO EXCHANGE BIOMETRIC INFORMATION

CROSS-REFERENCE TO RELATED APPLICATIONS

This application claims the benefit of priority to U.S. Patent Application No. 62/311,745, filed Mar. 22, 2016, entitled "Biometric Information Exchange System," the content of which is hereby incorporated by reference herein in its entirety.

FIELD

The present disclosure relates to virtual reality and augmented reality imaging and visualization systems, and in particular to systems and methods for exchanging information between such imaging and visualization systems.

BACKGROUND

A wearable display system, such as a virtual or an augmented reality device, can capture biometric information of a user. Biometric information can include physiological characteristics and/or behavioral characteristics associated with the wearer. Physiological characteristics can include body pose (e.g., eye gaze), pupil dilation state, facial characteristics (e.g., grinning or frowning), voice characteristics, pulse rate or blood pressure, skin condition (e.g., perspiration), and so forth. Behavioral characteristics can include gait, vocal characteristics, tendencies of the wearer, and so forth.

SUMMARY

Disclosed herein are embodiments of wearable display systems such as, e.g., augmented or virtual reality display devices, configured to exchange biometric information of a wearer of the wearable display system. In some embodiments, a head mounted display system comprises: a first image capture device configured to capture a plurality of eye images of an eye of a user; a second image capture device configured to capture a plurality of outside-world images; a display configured to display virtual images to the eye of a wearer of the head mounted display; and a hardware processor in communication with the first image capture device, the second image capture device, and the display, the hardware processor programmed to: communicate a consent request to a wearer of the head mounted display using the display, the request comprising a plurality of consent categories for biometric information of the wearer; receive a response to the consent request; determine that the response includes a consent indication from the wearer of the head mounted display, the consent indication regarding a consent category that the wearer has indicated agreement; obtain the plurality of eye images of the wearer of the head mounted display captured by the first image capture device; and in response to a request for biometric information from a biometric information acquirer computing device, transmit the plurality of eye images, to the biometric information acquirer computing device, based at least partly on the consent category that the wearer has indicated agreement and the request for biometric information.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Example Augmented Reality Scenario

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality "VR" scenario typically involves presentation of digital or virtual image information without transparency to other actual real-world visual input; an augmented reality "AR" scenario typically involves presentation of digital or virtual image information as an augmentation to visualization of the actual world around the user; or a mixed reality "MR" scenario that typically involves merging real and virtual worlds to produce new environment where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR, and MR technology.

Figure 1:
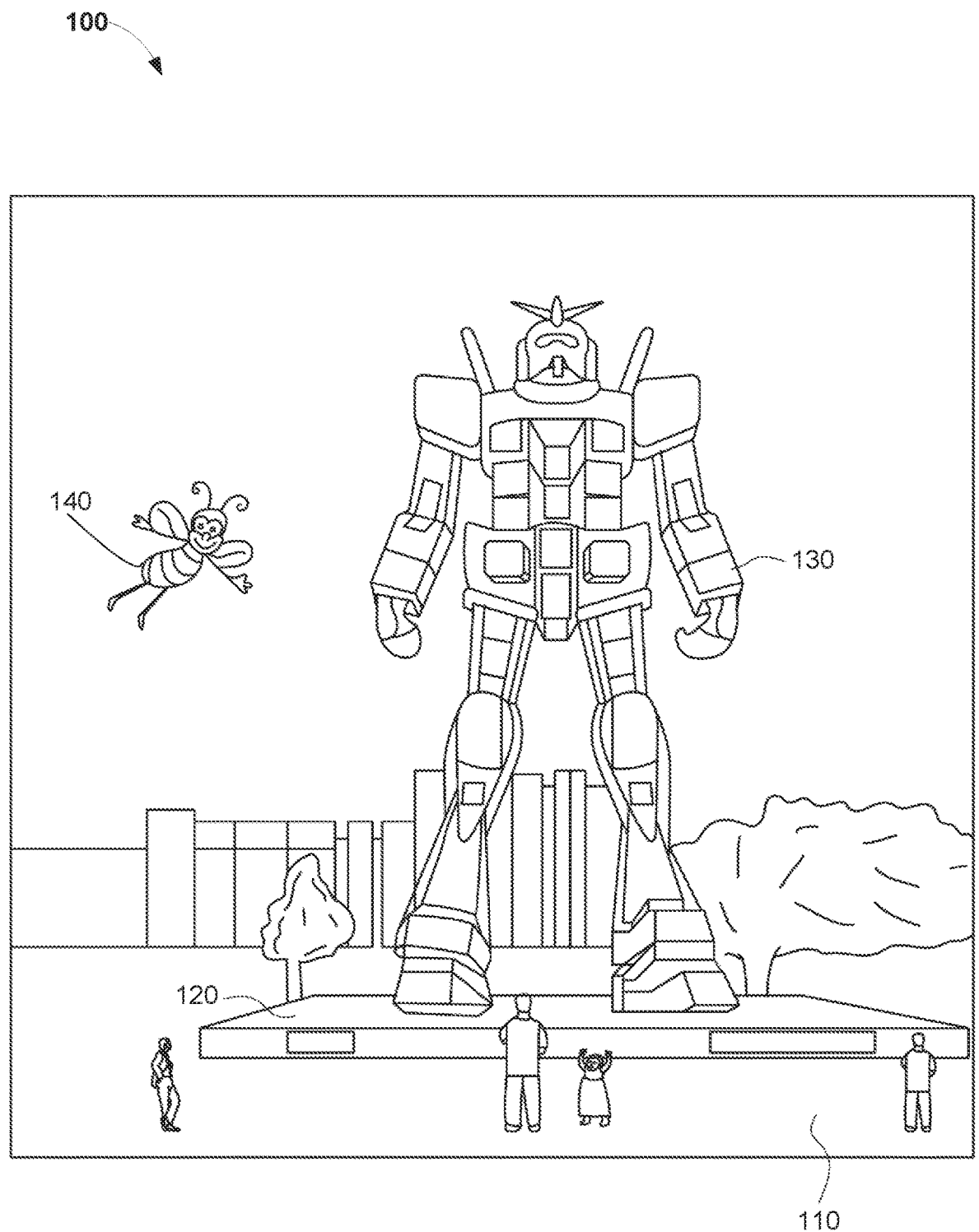
FIG. 1 depicts an illustration of an augmented reality scenario with certain virtual reality objects, and certain actual reality objects viewed by a person.

FIG. 1 depicts an illustration of an augmented reality scenario with certain virtual reality objects, and certain actual reality objects viewed by a person. FIG. 1 depicts an augmented reality scene 100, wherein a user of an AR technology sees a real-world park-like setting 110 featuring people, trees, buildings in the background, and a concrete platform 120. In addition to these items, the user of the AR technology also perceives that he "sees" a robot statue 130 standing upon the real-world platform 120, and a cartoon-like avatar character 140 (e.g., a bumble bee) flying by which seems to be a personification of a bumble bee, even though these elements do not exist in the real world.

In order for a three-dimensional (3-D) display to produce a true sensation of depth, and more specifically, a simulated sensation of surface depth, it is desirable for each point in the display's visual field to generate the accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane and/or based on observing different image features on different depth planes being out of focus. As discussed elsewhere herein, such depth cues provide credible perceptions of depth. To produce or enhance VR, AR, and MR experiences, display systems can use biometric information to enhance those experiences. For example, as described herein, a biometric information exchange system can facilitate exchange of biometric information between a wearer of the mixed reality display system and a biometric information acquirer computing device.

A mixed reality device (MRD), for example, a head mounted MR display system, may acquire substantial biometric information about the wearer of the MRD. The biometric information can include, for example, information about the wearer's head or eye movements (e.g., where the user is looking), pupil sizes (e.g., which may indicate wearer interest or excitement), timings (e.g., how long the user is looking at an item), imagery of the wearer's environment (e.g., what the wearer is looking at), the wearer's location, and so forth. The MRD may include sensors to measure the wearer's heart rate, pulse, blood pressure, skin response (e.g., perspiration), brain activity, etc. This biometric information may be stored in the device or in a networked storage system and may comprise a substantially large data set of detailed information about the wearer of the MRD. Although the foregoing has been described in the context of a mixed reality device, any wearable display system (e.g., the wearable display system 200 shown in FIG. 2 or the display system 400 in FIGS. 4 and 6) that captures or obtains biometric information may be utilized with the systems and methods described herein.

An entity may wish to acquire some portion of the wearer's biometric information. For example, a big box retailer may wish to determine when and for how long the wearer visits its retail stores, where the wearer travels within the store, what items and for how long the wearer looks at them, etc. As another example, a game developer may wish to determine what game characters the wearer looks at during play of the game, what selection choices the wearer makes when interacting with the characters, the wearer's level of interest, apprehension, or excitement during game play, and so forth.

Wearers of wearable display systems may have concerns regarding confidentiality of their respective biometric information. Similarly, potential acquirers of biometric information may desire to preserve such biometric information in the strictest confidence. Accordingly, both wearers and potential acquires of biometric information may desire to utilize a system or method for facilitating the exchange of biometric information that preserves the confidentiality of that information. The biometric information exchange system described herein preserves the confidentiality of biometric information. For example, described further below, biometric information exchange system may transmit a consent request regarding biometric information to a wearer of the wearable display system, before accessing any biometric information associated with that wearable display system. If the biometric information exchange system does not receive a consent indication from the wearer, no biometric information may be exchanged on the exchange system. On the other hand, if a wearer indicates agreement to an aspect of the consent request, the biometric information exchange system may facilitate access to the biometric information of that wearer, for example, via a secure connection.

Generally described, once a wearer has indicated agreement indicated to a consent request, the wearable display system may utilize a biometric information exchange system to provide biometric information to a computing device of a biometric information acquirer, for example, a biometric information acquirer computing device may obtain biometric information retrieved from a wearable display system over a secure connection during a biometric information exchange. Over that secure connection, the exchange system may grant access to biometric information of the wearer if that biometric information is preserved in the strictest confidence, whether by the secure connection in which the information is transmitted to a computing device of an acquirer of the biometric information or by an exchange system that facilitates the storage of such biometric information for future exchanges. Accordingly, the systems and methods disclosed herein facilitate the exchange of information between a wearable display system and a computing device of a potential acquirer of the biometric information.

Example Wearable Display System

Figure 2:
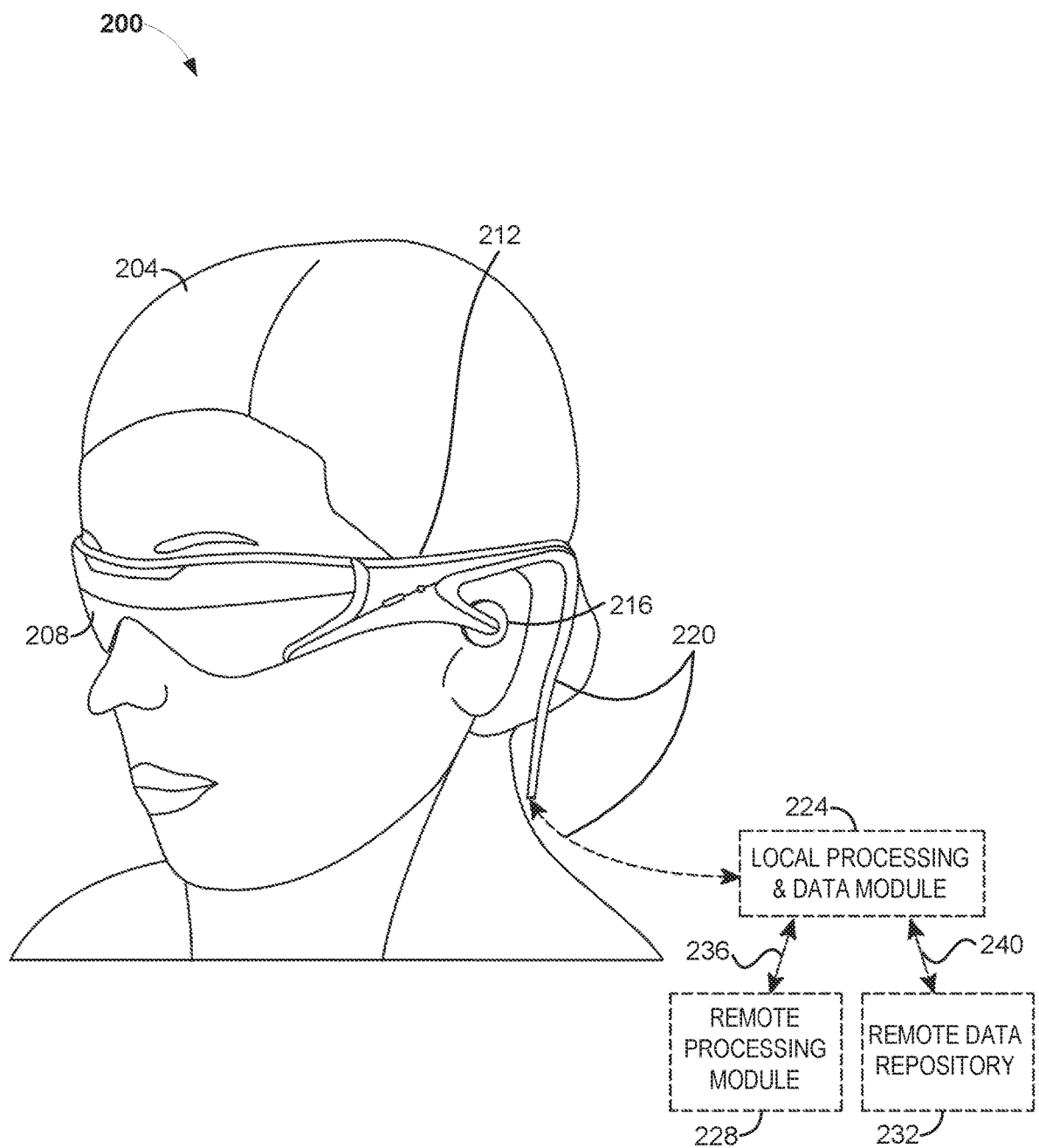
FIG. 2 schematically illustrates an example of a wearable display system.

FIG. 2 illustrates an example of a wearable display system 200 that can be used to present a VR, AR, or MR experience to a display system wearer or viewer 204. The wearable display system 200 may be programmed to perform any of the applications or embodiments described herein (e.g., eye image processing). The display system 200 includes a display 208, and various mechanical and electronic modules and systems to support the functioning of the display 208. The display 208 may be coupled to a frame 212, which is wearable by a display system user, wearer, or viewer 204 and which is configured to position the display 208 in front of the eyes of the wearer 204. The display 208 may be a light field display. In some embodiments, a speaker 216 is coupled to the frame 212 and positioned adjacent the ear canal of the user. In some embodiments, another speaker, not shown, is positioned adjacent the other ear canal of the user to provide for stereo/shapeable sound control. The display system 200 can include an outward-facing imaging system which observes the world in the environment around the wearer (see, e.g., the imaging system 454 shown in FIG. 4). The display system 200 can also include an inward-facing imaging system which can track the eye movements of the wearer (see, e.g., the inward-facing imaging system 452 shown in FIG. 4). The inward-facing imaging system may track either one eye's movements or both eyes' movements. The display 208 is operatively coupled 220, such as by a wired lead or wireless connectivity, to a local data processing module 224 which may be mounted in a variety of configurations, such as fixedly attached to the frame 212, fixedly attached to a helmet or hat worn by the user, embedded in headphones, or otherwise removably attached to the user 204 (e.g., in a backpack-style configuration, in a belt-coupling style configuration).

The frame 212 can have one or more cameras attached or mounted to the frame 212 to obtain images of the wearer's eye(s). In one embodiment, the camera(s) may be mounted to the frame 212 in front of a wearer's eye so that the eye can be imaged directly. In other embodiments, the camera can be mounted along a stem of the frame 212 (e.g., near the wearer's ear). In such embodiments, the display 208 may be coated with a material that reflects light from the wearer's eye back toward the camera. The light may be infrared light, since iris features are prominent in infrared images.

The local processing and data module 224 may comprise a hardware processor, as well as non-transitory digital memory, such as non-volatile memory (e.g., flash memory), both of which may be utilized to assist in the processing, caching, and storage of data. The data may include data (a) captured from sensors (which may be, e.g., operatively coupled to the frame 212 or otherwise attached to the user 204), such as image capture devices (such as cameras), microphones, inertial measurement units, accelerometers, compasses, gyroscopes, global positioning satellite (GPS units, radio devices, voice detectors, galvanic sensors, pulse or blood pressure sensors, electrocardiographic sensors, and/or electroencephalographic sensors; and/or (b) acquired and/or processed using remote processing module 228 and/ or remote data repository 232, possibly for passage to the display 208 after such processing or retrieval. The local processing and data module 224 may be operatively coupled to the remote processing module 228 and remote data repository 232 by communication links 236 and/or 240, such as via wired or wireless communication links, such that these remote modules 228, 232 are available as resources to the local processing and data module 224. The image capture device(s) can be used to capture the eye images used in the eye image processing procedures. In addition, the remote processing module 228 and remote data repository 232 may be operatively coupled to each other.

In some embodiments, the remote processing module 228 may comprise one or more processors configured to analyze and process data and/or image information such as video information captured by an image capture device. The video data may be stored locally in the local processing and data module 224 and/or in the remote data repository 232. In some embodiments, the remote data repository 232 may comprise a digital data storage facility, which may be available through the internet or other networking configuration in a "cloud" resource configuration. In some embodiments, all data is stored and all computations are performed in the local processing and data module 224, allowing fully autonomous use from a remote module.

In some implementations, the local processing and data module 224 and/or the remote processing module 228 are programmed to perform embodiments of systems and methods as described herein. The image capture device can capture video for a particular application (e.g., video of the wearer's eye for an eye-tracking application or video of a wearer's hand or finger for a gesture identification application). The video can be analyzed by one or both of the processing modules 224, 228. In some cases, off-loading at least some of the iris code generation to a remote processing module (e.g., in the "cloud") may improve efficiency or speed of the computations. The parameters of the systems and methods disclosed herein can be stored in data modules 224 and/or 228.

The results of the analysis can be used by one or both of the processing modules 224, 228 for additional operations or processing. For example, in various applications, biometric identification, eye-tracking, recognition, or classification of gestures, objects, poses, etc. may be used by the wearable display system 200. For example, the wearable display system 200 may analyze video captured of a hand of the wearer 204 and recognize a gesture by the wearer's hand (e.g., picking up a real or virtual object, signaling assent or dissent (e.g., "thumbs up", or "thumbs down"), etc.), and the wearable display system.

In some implementations, the display system 200 can also include an electrodermal sensor (e.g., a galvanic sensor) operable to detect skin sensing activity such as, e.g., skin conductance or galvanic skin response, which may be indicative of activity in the wearer's autonomic nervous system (e.g., causing perspiration or indicating stress). The display system 200 can also include other types of electrical sensors, such as electrical sensors detecting brain activity (e.g., as performed in an electroencephalogram test) or electrical sensors detecting heart activity (e.g., as performed in an electrocardiogram test). The electrodermal sensor and/or the electrical sensor may be operatively coupled by communication links such as via a wired or wireless communication links, to the display system 200. For example, a wired or wireless communication link may couple the electrodermal sensor and/or the electrical sensors to the local processing and data module 224, which, in turn, is associated with any processing modules operable to process biometric information of the display system 200. Accordingly, as an example, the electrodermal sensor can detect electrodermal activity or other measurements associated with the scan of the wearer of the display system 200. Such biometric information can also be processed by the display system 200.

The human visual system is complicated and providing a realistic perception of depth is challenging. Without being limited by theory, it is believed that viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic or comfortable simulations of three-dimensional imagery.

Figure 3:
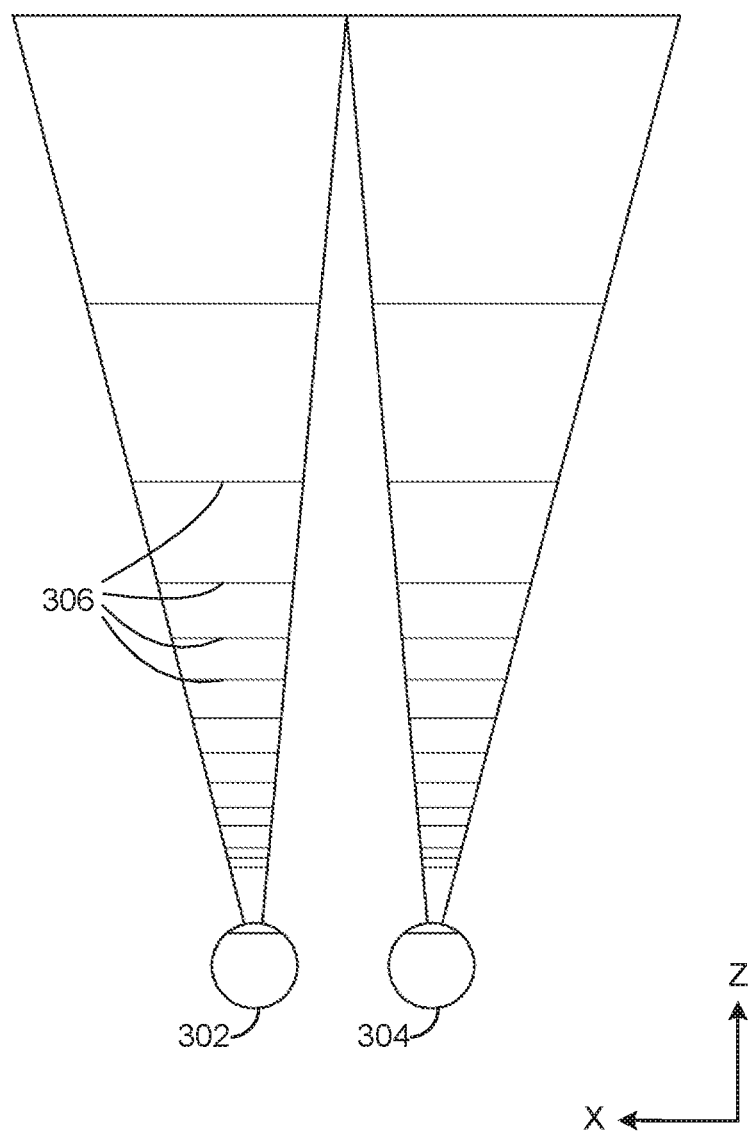
FIG. 3 schematically illustrates aspects of an approach for simulating three-dimensional imagery using multiple depth planes.

FIG. 3 illustrates aspects of an approach for simulating three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, with an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Example Waveguide Stack Assembly

Figure 4:
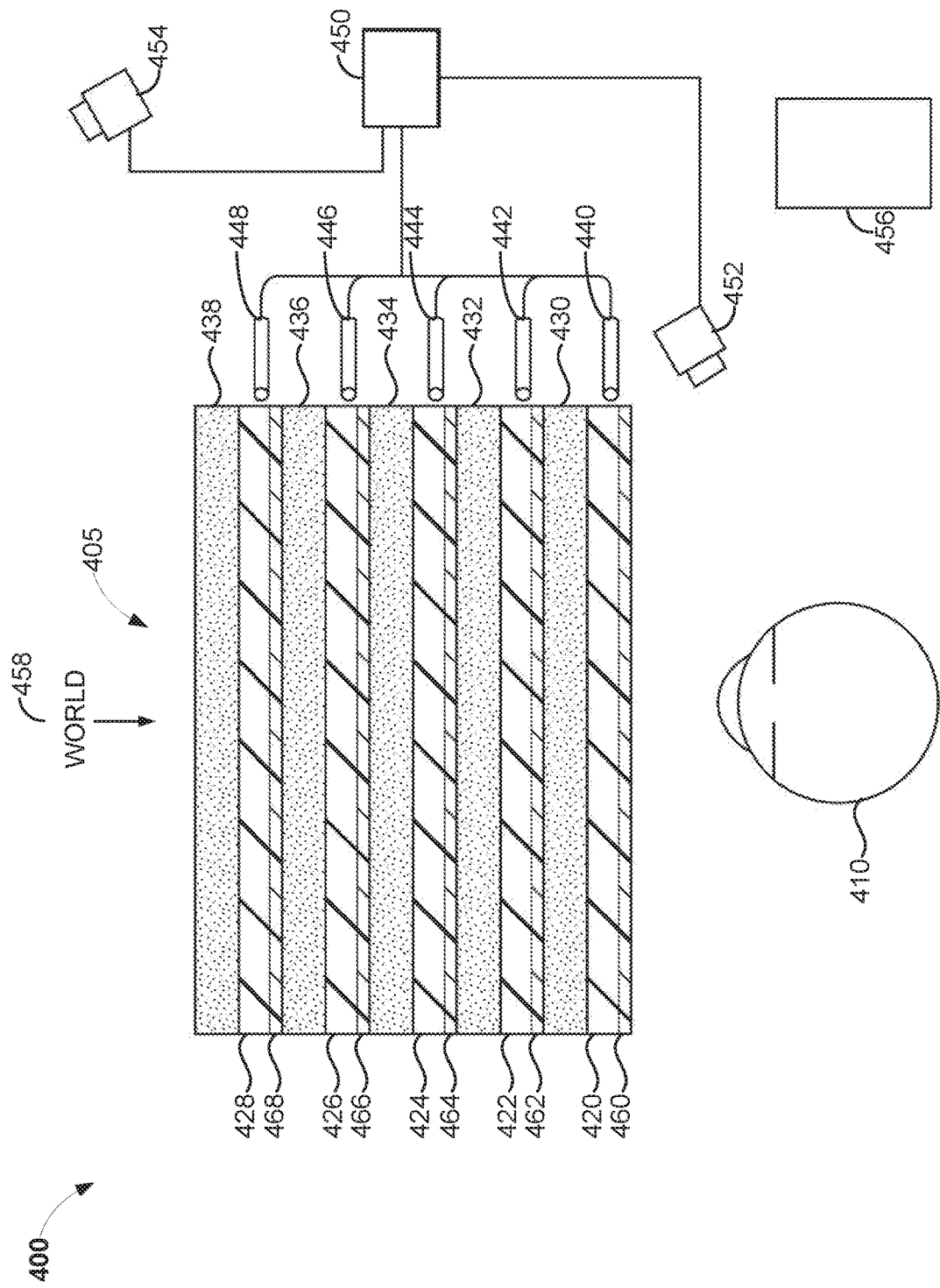
FIG. 4 schematically illustrates an example of a waveguide stack for outputting image information to a user.

FIG. 4 illustrates an example of a waveguide stack for outputting image information to a user. A display system 400 includes a stack of waveguides, or stacked waveguide assembly 405 that may be utilized to provide three-dimensional perception to the eye 410 or brain using a plurality of waveguides 420, 422, 424, 426, 428. In some embodiments, the display system 400 may correspond to system 200 of FIG. 2, with FIG. 4 schematically showing some parts of that system 200 in greater detail. For example, in some embodiments, the waveguide assembly 405 may be integrated into the display 208 of FIG. 2.

With continued reference to FIG. 4, the waveguide assembly 405 may also include a plurality of features 430, 432, 434, 436 between the waveguides. In some embodiments, the features 430, 432, 434, 436 may be lenses. In some embodiments, the features 430, 432, 434, 436 may not be lenses. Rather, they may be spacers (e.g., cladding layers and/or structures for forming air gaps).

The waveguides 420, 422, 424, 426, 428 and/or the plurality of lenses 430, 432, 434, 436 may be configured to send image information to the eye with various levels of wavefront curvature or light ray divergence. Each waveguide level may be associated with a particular depth plane and may be configured to output image information corresponding to that depth plane. Image injection devices 440, 442, 444, 446, 448 may be utilized to inject image information into the waveguides 420, 422, 424, 426, 428, each of which may be configured to distribute incoming light across each respective waveguide, for output toward the eye 410. Light exits an output surface of the image injection devices 440, 442, 444, 446, 448 and is injected into a corresponding input edge of the waveguides 420, 422, 424, 426, 428. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 440, 442, 444, 446, 442 are discrete displays that each produce image information for injection into a corresponding waveguide 420, 422, 424, 426, 428, respectively. In some other embodiments, the image injection devices 440, 442, 446, 446, 448 are the output ends of a single multiplexed display which may, for example, pipe image information via one or more optical conduits (such as fiber optic cables) to each of the image injection devices 440, 442, 444, 446, 448.

A controller 450 controls the operation of the stacked waveguide assembly 405 and the image injection devices 440, 442, 444, 446, 448. In some embodiments, the controller 450 includes programming (e.g., instructions in a non-transitory computer-readable medium) that regulates the timing and provision of image information to the waveguides 420, 422, 424, 426, 428. In some embodiments, the controller 450 may be a single integral device, or a distributed system connected by wired or wireless communication channels. The controller 450 may be part of the processing modules 224 or 228 (illustrated in FIG. 2) in some embodiments. In some embodiments, the controller may be in communication with an inward-facing imaging system 452 (e.g., a digital camera), an outward-facing imaging system 454 (e.g., a digital camera), and/or a user input device 456. The inward-facing imaging system 452 (e.g., a digital camera) can be used to capture images of the eye 410 to, for example, determine the size and/or orientation of the pupil of the eye 410. The outward-facing imaging system 454 can be used to image a portion of the world 458. The user can input commands to the controller 450 via the user input device 456 to interact with the display system 400.

The waveguides 420, 422, 424, 426, 428 may be configured to propagate light within each respective waveguide by total internal reflection (TIR). The waveguides 420, 422, 424, 426, 428 may each be planar or have another shape (e.g., curved), with major top and bottom surfaces and edges extending between those major top and bottom surfaces. In the illustrated configuration, the waveguides 420, 422, 424, 426, 428 may each include light extracting optical elements 460, 462, 464, 466, 468 that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (460, 462, 464, 466, 468 may, for example, be reflective and/or diffractive optical features. While illustrated disposed at the bottom major surfaces of the waveguides 420, 422, 424, 426, 428 for ease of description and drawing clarity, in some embodiments, the light extracting optical elements 460, 462, 464, 466, 468 may be disposed at the top and/or bottom major surfaces, and/or may be disposed directly in the volume of the waveguides 420, 422, 424, 426, 428. In some embodiments, the light extracting optical elements 460, 462, 464, 466, 468 may be formed in a layer of material that is attached to a transparent substrate to form the waveguides 420, 422, 424, 426, 428. In some other embodiments, the waveguides 420, 422, 424, 426, 428 may be a monolithic piece of material and the light extracting optical elements 460, 462, 464, 466, 468 may be formed on a surface and/or in the interior of that piece of material.

With continued reference to FIG. 4, as discussed herein, each waveguide 420, 422, 424, 426, 428 is configured to output light to form an image corresponding to a particular depth plane. For example, the waveguide 420 nearest the eye may be configured to deliver collimated light, as injected into such waveguide 420, to the eye 410. The collimated light may be representative of the optical infinity focal plane. The next waveguide up 422 may be configured to send out collimated light which passes through the first lens 430 (e.g., a negative lens) before it can reach the eye 410. First lens 430 may be configured to create a slight convex wavefront curvature so that the eye/brain interprets light coming from that next waveguide up 422 as coming from a first focal plane closer inward toward the eye 410 from optical infinity. Similarly, the third up waveguide 424 passes its output light through both the first lens 430 and second lens 432 before reaching the eye 410. The combined optical power of the first and second lenses 430 and 432 may be configured to create another incremental amount of wavefront curvature so that the eye/brain interprets light coming from the third waveguide 424 as coming from a second focal plane that is even closer inward toward the person from optical infinity than is light from the next waveguide up 422.

The other waveguide layers (e.g., waveguides 426, 428) and lenses (e.g., lenses 434, 436) are similarly configured, with the highest waveguide 428 in the stack sending its output through all of the lenses between it and the eye for an aggregate focal power representative of the closest focal plane to the person. To compensate for the stack of lenses 430, 432, 434, 436 when viewing/interpreting light coming from the world 458 on the other side of the stacked waveguide assembly 405, a compensating lens layer 438 may be disposed at the top of the stack to compensate for the aggregate power of the lens stack 430, 432, 434, 436 below. Such a configuration provides as many perceived focal planes as there are available waveguide/lens pairings. Both the light extracting optical elements 460, 462, 464, 466, 468 of the waveguides 420, 422, 424, 426, 428 and the focusing aspects of the lenses 430, 432, 434, 436 may be static (e.g., not dynamic or electro-active). In some alternative embodiments, either or both may be dynamic using electro-active features.

With continued reference to FIG. 4, the light extracting optical elements 460, 462, 464, 466, 468 may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 460, 462, 464, 466, 468 may be volumetric or surface features, which may be configured to output light at specific angles. For example, the light extracting optical elements 460, 462, 464, 466, 468 may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety. In some embodiments, the features 430, 432, 434, 436, 438 may not be lenses. Rather, they may simply be spacers (e.g., cladding layers and/or structures for forming air gaps).

In some embodiments, the light extracting optical elements 460, 462, 464, 466, 468 are diffractive features that form a diffraction pattern, or "diffractive optical element" (also referred to herein as a "DOE"). Preferably, the DOEs have a relatively low diffraction efficiency so that only a portion of the light of the beam is deflected away toward the eye 410 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 410 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes and/or depth of field may be varied dynamically based on the pupil sizes and/or orientations of the eyes of the viewer. In some embodiments, an inward-facing imaging system 452 (e.g., a digital camera) may be used to capture images of the eye 410 to determine the size and/or orientation of the pupil of the eye 410. The inward-facing imaging system 452 can be used to obtain images for use in determining the direction the wearer 204 is looking (e.g., eye pose). In some embodiments, the inward-facing imaging system 452 may be attached to the frame 212 (as illustrated in FIG. 2) and may be in electrical communication with the processing modules 224 and/or 228, which may process image information from the inward-facing imaging system 452) to determine, e.g., the pupil diameters, or orientations of the eyes or eye pose of the user 204.

In some embodiments, the inward-facing imaging system 452 (e.g., a digital camera) can observe the movements of the user, such as the eye movements and the facial movements. The inward-facing imaging system 452 may be used to capture images of the eye 410 to determine the size and/or orientation of the pupil of the eye 410. The inward-facing imaging system 452 can be used to obtain images for use in determining the direction the user is looking (e.g., eye pose)

or for biometric identification of the user (e.g., via iris identification). The images obtained by the inward-facing imaging system 452 may be analyzed to determine the user's eye pose and/or mood, which can be used by the display system 400 to decide which audio or visual content should be presented to the user. The display system 400 may also determine head pose (e.g., head position or head orientation) using sensors such as inertial measurement units (IMUs), accelerometers, gyroscopes, etc. The head's pose may be used alone or in combination with eye pose to interact with stem tracks and/or present audio content.

In some embodiments, one camera may be utilized for each eye, to separately determine the pupil size and/or orientation of each eye, thereby allowing the presentation of image information to each eye to be dynamically tailored to that eye. In some embodiments, at least one camera may be utilized for each eye, to separately determine the pupil size and/or eye pose of each eye independently, thereby allowing the presentation of image information to each eye to be dynamically tailored to that eye. In some other embodiments, the pupil diameter and/or orientation of only a single eye 410 (e.g., using only a single camera per pair of eyes) is determined and assumed to be similar for both eyes of the viewer 204.

For example, depth of field may change inversely with a viewer's pupil size. As a result, as the sizes of the pupils of the viewer's eyes decrease, the depth of field increases such that one plane not discernible because the location of that plane is beyond the depth of focus of the eye may become discernible and appear more in focus with reduction of pupil size and commensurate increase in depth of field. Likewise, the number of spaced apart depth planes used to present different images to the viewer may be decreased with decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size and/or orientation, or upon receiving electrical signals indicative of particular pupil sizes and/or orientations. For example, if the user's eyes are unable to distinguish between two depth planes associated with two waveguides, then the controller 450 may be configured or programmed to cease providing image information to one of these waveguides. Advantageously, this may reduce the processing burden on the system, thereby increasing the responsiveness of the system. In embodiments in which the DOEs for a waveguide are switchable between on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The display system 400 can include an outward-facing imaging system 454 (e.g., a digital camera) that images a portion of the world 458. This portion of the world 458 may be referred to as the field of view (FOV) and the imaging system 454 is sometimes referred to as an FOV camera. The entire region available for viewing or imaging by a viewer 204 may be referred to as the field of regard (FOR). The FOR may include 4π steradians of solid angle surrounding the display system 400. In some implementations of the display system 400, the FOR may include substantially all of the solid angle around a user 204 of the display system 400, because the user 204 can move their head and eyes to look at objects surrounding the user (in front, in back, above, below, or on the sides of the user). Images obtained from the outward-facing imaging system 454 can be used to track gestures made by the user (e.g., hand or finger gestures), detect objects in the world 458 in front of the user, and so forth.

The display system 400 can include a user input device 456 by which the user can input commands to the controller 450 to interact with the display system 400. For example, the user input device 456 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. In some cases, the user may use a finger (e.g., a thumb) to press or swipe on a touch-sensitive input device to provide input to the display system 400 (e.g., to provide user input to a user interface provided by the display system 400). The user input device 456 may be held by the user's hand during the use of the display system 400. The user input device 456 can be in wired or wireless communication with the display system 400.

Figure 5:
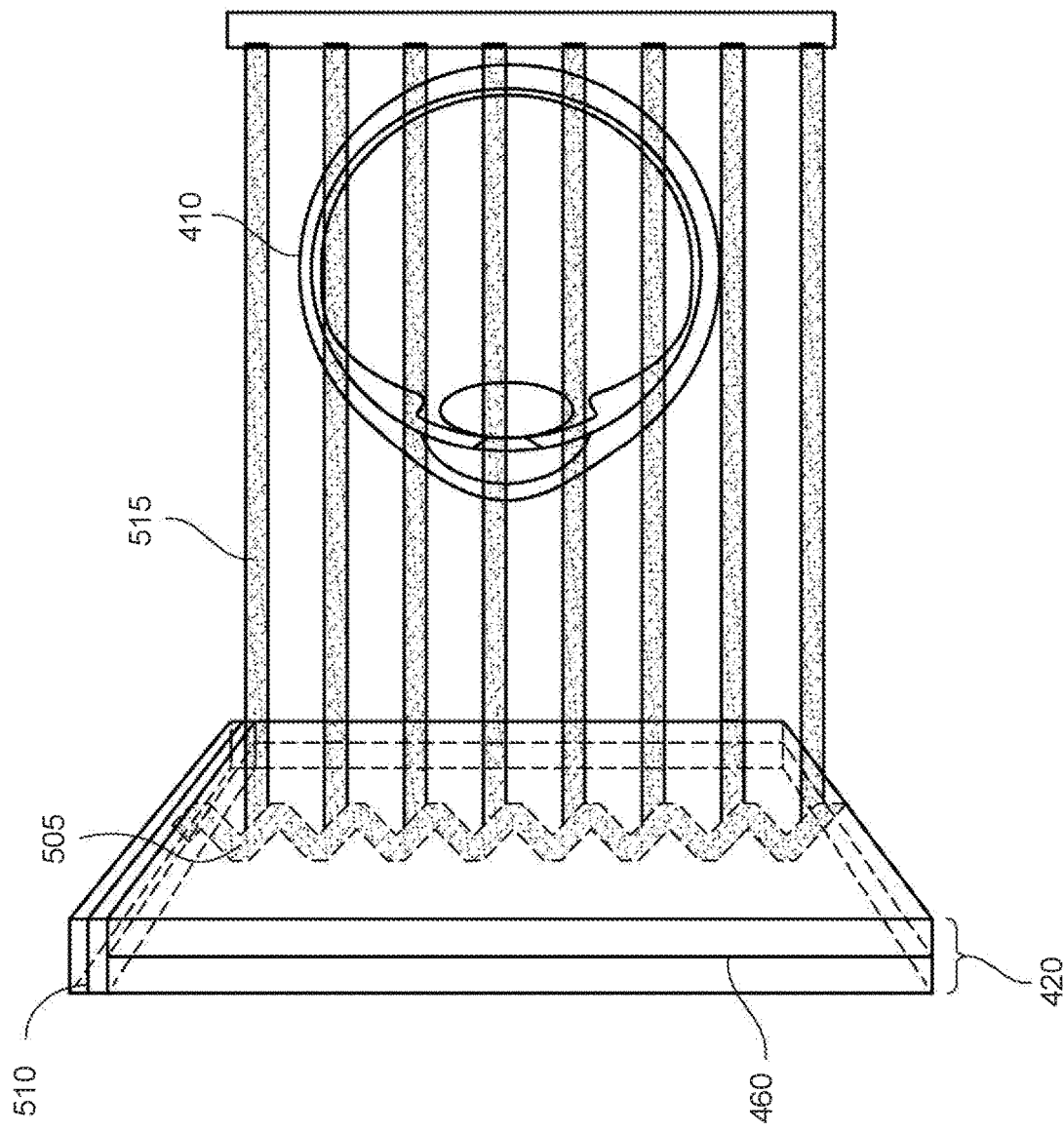
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 405 may function similarly, where the waveguide assembly 405 includes multiple waveguides. Light 505 is injected into the waveguide 420 at the input edge 510 of the waveguide 420 and propagates within the waveguide 420 by total internal reflection (TIR). At points where the light 505 impinges on the diffractive optical element (DOE) 460, a portion of the light exits the waveguide as exit beams 515. The exit beams 515 are illustrated as substantially parallel but they may also be redirected to propagate to the eye 410 at an angle (e.g., forming divergent exit beams), depending on the depth plane associated with the waveguide 420. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
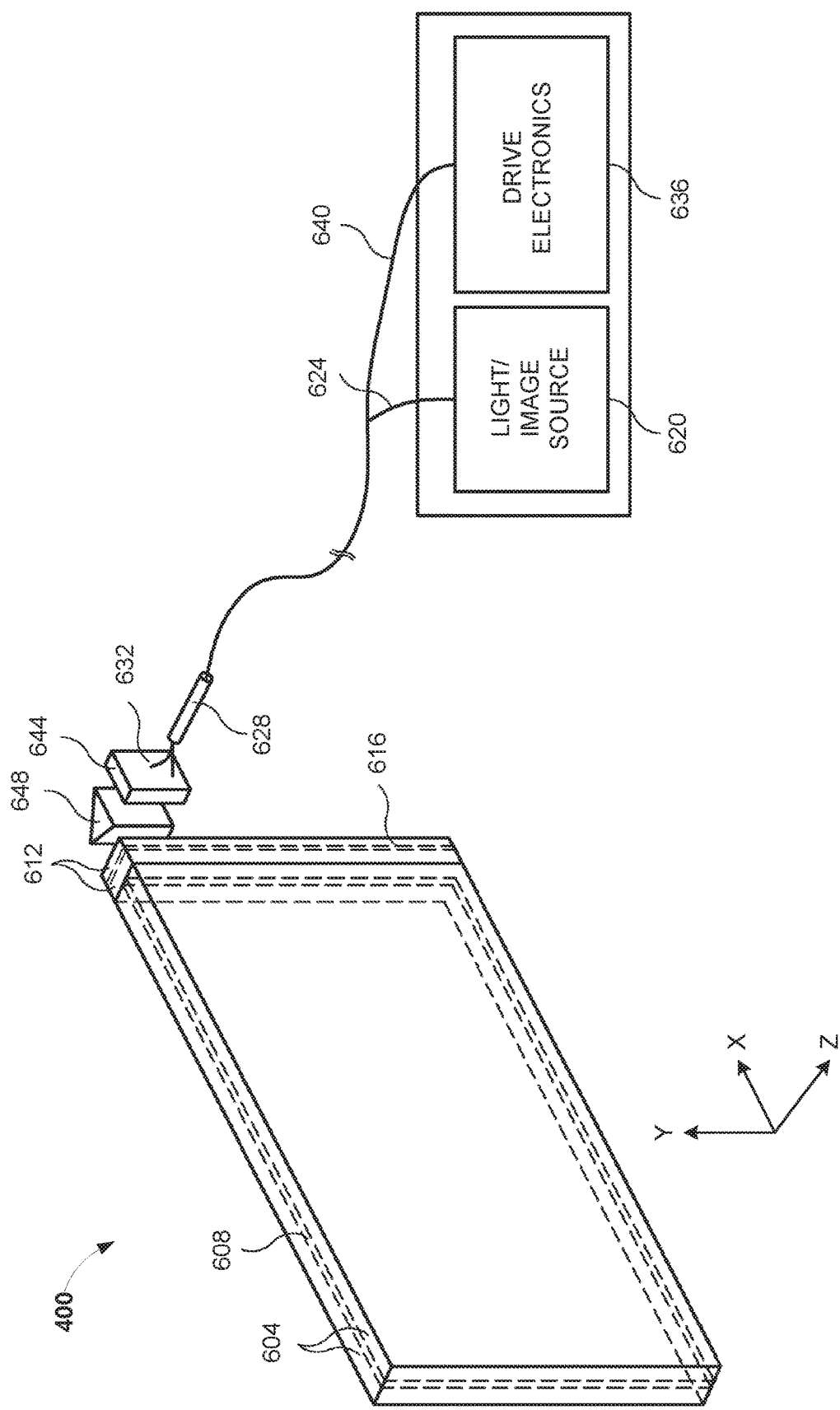
FIG. 6 is a schematic diagram showing a display system including a waveguide apparatus, an optical coupler subsystem to optically couple light to or from the waveguide apparatus, and a control subsystem, used in the generation of a multi-focal volumetric display, image, or light field.

FIG. 6 shows another example of the display system 400 including a waveguide apparatus, an optical coupler subsystem to optically couple light to or from the waveguide apparatus, and a control subsystem. The display system 400 can be used to generate a multi-focal volumetric, image, or light field. The display system 400 can include one or more primary planar waveguides 604 (only one is shown in FIG. 6) and one or more DOEs 608 associated with each of at least some of the primary waveguides 604. The planar waveguides 604 can be similar to the waveguides 420, 422, 424, 426, 428 discussed with reference to FIG. 4. The optical system may employ a distribution waveguide apparatus, to relay light along a first axis (vertical or Y-axis in view of FIG. 6), and expand the light's effective exit pupil along the first axis (e.g., Y-axis). The distribution waveguide apparatus, may, for example include a distribution planar waveguide 612 and at least one DOE 616 (illustrated by double dash-dot line) associated with the distribution planar waveguide 612. The distribution planar waveguide 612 may be similar or identical in at least some respects to the primary planar waveguide 604, having a different orientation therefrom. Likewise, the at least one DOE 616 may be similar or identical in at least some respects to the DOE 608. For example, the distribution planar waveguide 612 and/or DOE 616 may be comprised of the same materials as the primary planar waveguide 604 and/or DOE 608, respectively. The optical system shown in FIG. 6 can be integrated into the wearable display system 200 shown in FIG. 2.

The relayed and exit-pupil expanded light is optically coupled from the distribution waveguide apparatus into the one or more primary planar waveguides 604. The primary planar waveguide 604 relays light along a second axis, preferably orthogonal to first axis, (e.g., horizontal or X-axis in view of FIG. 6). Notably, the second axis can be a non-orthogonal axis to the first axis. The primary planar waveguide 604 expands the light's effective exit path along that second axis (e.g., X-axis). For example, the distribution planar waveguide 612 can relay and expand light along the vertical or Y-axis, and pass that light to the primary planar waveguide 604 which relays and expands light along the horizontal or X-axis.

The display system 400 may include one or more sources of colored light (e.g., red, green, and blue laser light) 620 which may be optically coupled into a proximal end of a single mode optical fiber 624. A distal end of the optical fiber 624 may be threaded or received through a hollow tube 628 of piezoelectric material. The distal end protrudes from the tube 628 as fixed-free flexible cantilever 632. The piezoelectric tube 628 can be associated with four quadrant electrodes (not illustrated). The electrodes may, for example, be plated on the outside, outer surface or outer periphery or diameter of the tube 628. A core electrode (not illustrated) is also located in a core, center, inner periphery or inner diameter of the tube 628.

Drive electronics 636, for example electrically coupled via wires 640, drive opposing pairs of electrodes to bend the piezoelectric tube 628 in two axes independently. The protruding distal tip of the optical fiber 624 has mechanical modes of resonance. The frequencies of resonance can depend upon a diameter, length, and material properties of the optical fiber 624. By vibrating the piezoelectric tube 628 near a first mode of mechanical resonance of the fiber cantilever 632, the fiber cantilever 632 is caused to vibrate, and can sweep through large deflections.

By stimulating resonant vibration in two axes, the tip of the fiber cantilever 632 is scanned biaxially in an area filling two dimensional (2-D) scan. By modulating an intensity of light source(s) 620 in synchrony with the scan of the fiber cantilever 632, light emerging from the fiber cantilever 632 forms an image. Descriptions of such a set up are provided in U.S. Patent Publication No. 2014/0003762, which is incorporated by reference herein in its entirety.

A component 644 of an optical coupler subsystem collimates the light emerging from the scanning fiber cantilever 632. The collimated light is reflected by mirrored surface 648 into the narrow distribution planar waveguide 612 which contains the at least one diffractive optical element (DOE) 616. The collimated light propagates vertically (relative to the view of FIG. 6) along the distribution planar waveguide 612 by total internal reflection, and in doing so repeatedly intersects with the DOE 616. The DOE 616 preferably has a low diffraction efficiency. This causes a fraction (e.g., 10%) of the light to be diffracted toward an edge of the larger primary planar waveguide 604 at each point of intersection with the DOE 616, and a fraction of the light to continue on its original trajectory down the length of the distribution planar waveguide 612 via TIR.

At each point of intersection with the DOE 616, additional light is diffracted toward the entrance of the primary waveguide 612. By dividing the incoming light into multiple outcoupled sets, the exit pupil of the light is expanded vertically by the DOE 616 in the distribution planar waveguide 612. This vertically expanded light coupled out of distribution planar waveguide 612 enters the edge of the primary planar waveguide 604.

Light entering primary waveguide 604 propagates horizontally (relative to the view of FIG. 6) along the primary waveguide 604 via TIR. As the light intersects with DOE 608 at multiple points as it propagates horizontally along at least a portion of the length of the primary waveguide 604 via TIR. The DOE 608 may advantageously be designed or configured to have a phase profile that is a summation of a linear diffraction pattern and a radially symmetric diffractive pattern, to produce both deflection and focusing of the light. The DOE 608 may advantageously have a low diffraction efficiency (e.g., 10%), so that only a portion of the light of the beam is deflected toward the eye of the view with each intersection of the DOE 608 while the rest of the light continues to propagate through the waveguide 604 via TIR.

At each point of intersection between the propagating light and the DOE 608, a fraction of the light is diffracted toward the adjacent face of the primary waveguide 604 allowing the light to escape the TIR, and emerge from the face of the primary waveguide 604. In some embodiments, the radially symmetric diffraction pattern of the DOE 608 additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 604 by a multiplicity of DOEs 608 at different angles, focus levels, and/or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Example of Biometric Exchange Operating Environment

Figure 7:
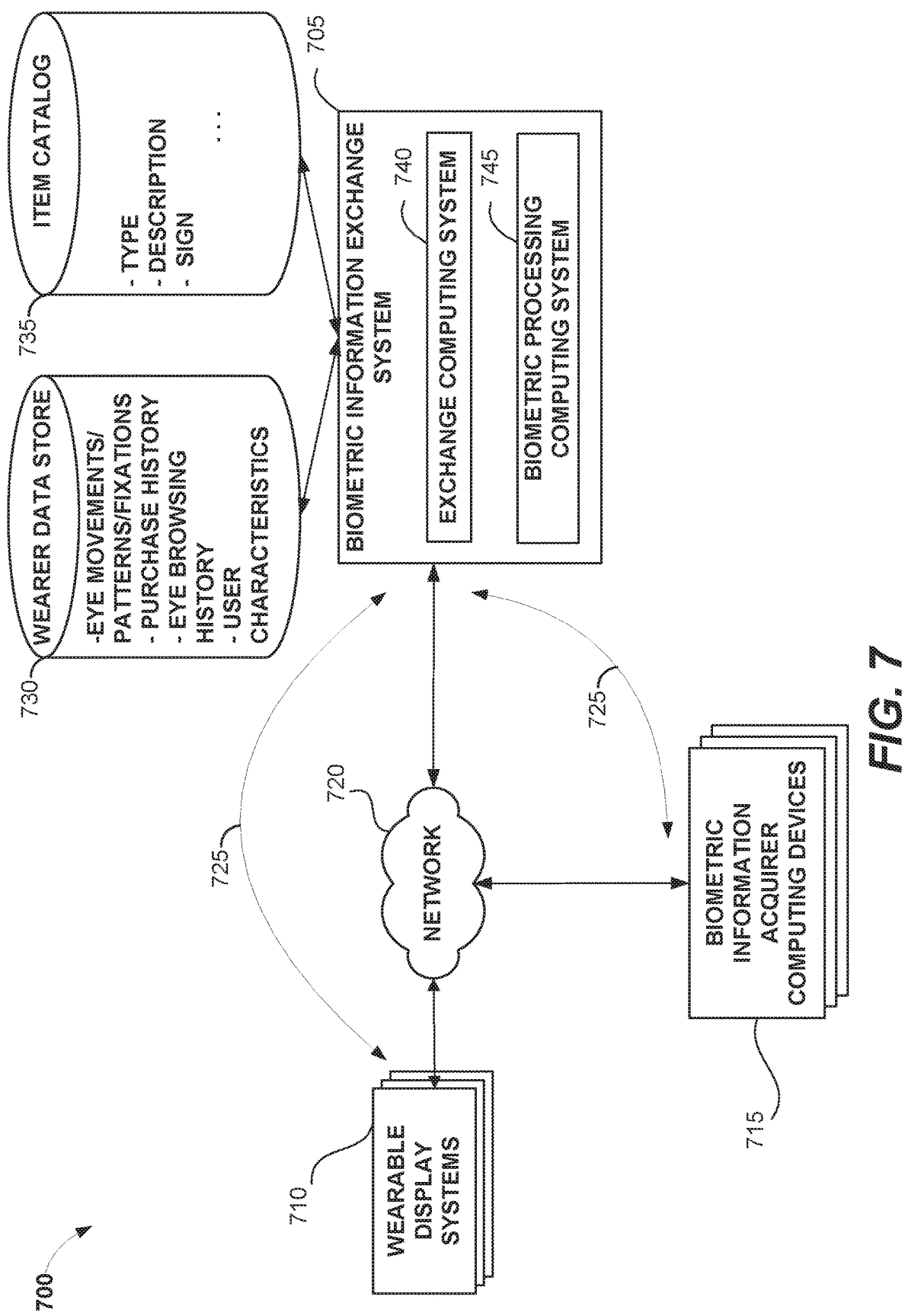
FIG. 7 is a block diagram depicting an illustrative operating environment in which a biometric information exchange system exchanges information between wearable display systems and computing devices of potential acquirers of biometric information of a wearer.

FIG. 7 is a block diagram depicting an illustrative operating environment 700 in which a biometric information exchange system 705 exchanges information between wearable display systems and computing devices capable of acquiring biometric information from a wearer. Biometric information can include physiological characteristics and/or behavioral characteristics associated with a wearer (e.g., the wearer 204 in FIG. 2). For example, physiological characteristics can include, but are not limited to, body pose, eye pose (e.g., eye gaze), pupil dilation state, facial characteristics (e.g., grinning or frowning), voice characteristics, pulse rate or blood pressure, skin condition (e.g., perspiration), and so forth. For example, behavioral characteristics can include, but are not limited to, gait (a physiological characteristic of how the wearer walks), vocal characteristics, tendencies of the wearer, and so forth. Physiological and behavioral characteristics may not mutually exclusive and, in some cases, biometric information can be classed as both physiological and behavioral. For example, a wearer's vocal characteristics may not only a physiological characteristic but also can be influenced by the mood or emotions of the wearer. Likewise, a wearer's gait can be influenced by the wearer's surroundings, who the wearer is accompanied by, the wearer's mood, and so forth.

A biometric information exchange system 705 can be implemented by a computer server, any computing system, or processing modules 224, 228. In some embodiments, the server implementing the biometric information exchange system 705 also hosts a network site (e.g., an internet website) that a wearer is browsing using a wearable display system 710 (e.g., the wearable display system 200). For example, the biometric information exchange system 705 can host display pages 800a-800e and popups described below with reference to FIGS. 8A-8E. The biometric information exchange system 705 can thereby facilitate retrieval of biometric information and provision for offers for exchanging biometric information from a biometric information acquirer computing device 715 to a wearer of a wearable display system 710 (e.g., the wearable display system 200). The biometric information exchange system 705 can form, through a network 700, a secure connection 725 between the wearable display system 710 and the biometric information acquirer computing device 715. For example, the biometric information exchange system 705 can encrypt any information transmitted on the secure connection 725. Accordingly, the biometric information exchange system 705 acts as an intermediary server that facilitates the secure connection 725 between certain wearable display systems 710 in certain biometric information acquirer computing devices 715. Such a secure connection 725 can preserve confidentiality and facilitate the exchange of biometric information between the wearable display systems 710 and the biometric information acquirer computing devices 715. In some implementations, the secure connection 725 allows direct access by the biometric information acquirer computing device 715 and a data store or processing module of the wearable display system 710 (e.g., local processing and data module 224) where biometric information of the wearer can be stored. For example, in one embodiment, the biometric information exchange system 705 does not analyze biometric or perform biometric operations (such as described with reference to biometric processing computing system 745 below), but acts as a conduit of biometric information between the wearable display system 710 and a biometric information acquirer 715 via the secure connection 725. In various implementations, as described further below, the biometric information exchange system 705 facilitates access to biometric information for a biometric information acquirer computing device 715 via biometric processing results generated utilizing data stored in either the wearer data store 730 or the item catalog 735 (or electronic catalog).

The biometric information exchange system 705 can be implemented by a separate server in communication with a server (not shown) hosting the network site, or is implemented as web service itself. In such a case, the separate server can also act as an intermediary server that facilitates a secure connection 725 between a wearer of the wearable display system 710 and the biometric information acquirer computing device 715. In yet further embodiments, the facilitated exchange of information between the wearable display system 710 and the computing device 715 of a potential acquirer of biometric information is distributed between the wearable display system 710, a server hosting the network site, and the biometric information exchange system 705. However, for brevity, the remaining disclosure refers to the embodiment in which the biometric information exchange system 705 transmits consent requests, obtains biometric information, and generates biometric information exchanges thereto. In such embodiments, the biometric information exchange system 705 can implement an exchange computing system 740 and a biometric processing computing system 745.

The exchange computing system 740 and biometric processing computing system 745 can work in conjunction with each other to facilitate exchanges. For example, an exchange, facilitated by the exchange computing system 740, can specify that a biometric information acquirer agrees to process eye images with the biometric processing computing system 745 to obtain a behavioral characteristic regarding the wearer (e.g., the number of times that the wearer glanced at a particular product or the types of locations in which those glances occur). Accordingly, the exchange computing system 740 can interact with the wearer of the wearable display system 710 by displaying a consent request that includes the content of this potential exchange utilizing the exchange computing system 740. In some implementations, as described further below, the exchange computing system 740 can alter the format of a consent request for such a potential exchange by specifying the types of biometric information that the biometric information acquirer would like to access to facilitate this exchange. For example, to obtain a behavioral characteristic, such as the types of location in which eye movements occurred, the biometric processing computing system 745 can access a GPS unit of the wearable display system 710 or obtain a location of the wearable display 710 determined by, for example, a GPS unit of the wearable display system 710.

The exchange computing system 740 can implement routines to obtain various types of biometric information from a wearer utilizing a wearable display system 710, and process the biometric information to generate a biometric information processing result for a biometric information acquirer computing device 715. For example, the exchange computing system 740 can implement routine 900, as described below, for exchanging biometric information, which can include displaying a consent request regarding biometric information with a wearable display system 710, obtaining biometric information from a wearer utilizing the wearable display system 710, and/or processing the biometric information to generate a biometric information processing result for a biometric information acquirer computing device 715.

When a consent indication has been received from a wearer of a wearable display system 710, the exchange computing system 740 can implement a biometric information exchange based on various factors. As an example, a potential acquirer can specify certain categories of biometric information (e.g., physiological or behavior information), types of wearers (e.g., a certain demographic) utilizing the wearable display system 710, and exchange rates for biometric information.

A wearer utilizing the wearable display system 710 can be a wearer associated with a certain demographic. Demographics can specify types of wearers that frequent a particular retail store with product items (e.g., a store that offers food product items), wearers that utilize particular services (e.g., professional services, hospitality services, etc.), or wearers that are associated with a particular biographical demographic (e.g., gender, age, place of residence, citizenship, etc.). A biometric information acquirer computing device 715 can specify biometric information exchanges based on biometric information or types of wearers (e.g., a certain demographic of wearers). In some implementations, the biometric information acquirer computing device 715 can also specify an exchange rate for biometric information acquired from a particular type of wearer.

Various types of biometric information can be processed or obtained by the biometric processing computing system 745. For example, in various implementations, the biometric processing computing system 745 implements routines to obtain sets of images from a wearable display system 710, and perform biometric operations on the correlated sets of images. Such routines can generate biometric information for utilization in a biometric exchange and/or a biometric application. Various biometric operations can be performed on sets of images obtained from a wearable display system 710 to generate various types of biometric information. As an example, eye images of a wearer captured by one camera (e.g., the inward-facing imaging system 452) and images of the outside world surrounding the wearer (e.g., the outward-facing imaging system 454) can be correlated with each other to determine an eye fixation of a wearer utilizing the display system. Illustratively, such a correlation can be determined based on a time correlation (e.g., determined on the basis of a timestamp associated with each image). For example, if an eye image and an outside-world image each has a timestamp of 4:23:42 P.M., both images can be associated with each other based on this time correlation. A timestamp may have a precision of 1 s, 0.1 s, 0.01 s, 1 ms, 0.1 ms, 0.01 ms, 1 ns or less. Correlations can be determined based on the precisions of timestamps. Other correlations are possible. As another example embodiment, images can be correlated in real time based on corresponding image acquisition systems that associates eye images and outside-world images simultaneously. For example, as described further below, dynamic features of the eye such as pupil dilation, which may be obtained from processing eye images (e.g., captured by eye-tracking camera(s), such as the inward-facing imaging system 452), can be correlated with outside-world images (e.g., captured by the outward-facing imaging system 454) to identify an object of the wearer's interest. Additionally or alternatively, biometric processing computing system 745 can process biometric information or any data obtained from the wearable display system 710 to obtain behavioral characteristics regarding a wearer, as described further below with reference to FIG. 8B.

As another example of performing a biometric operation with eye images and outside-world images, extracting biometric information from an eye in an eye image generally can include segmenting regions of each eye image corresponding to the iris of an eye of a wearer. Iris segmentation can involve operations including determining the iris boundaries, determining the pupillary and limbic boundaries of the iris, localizing upper or lower eyelids if they occlude the iris, detecting and excluding occlusions of eyelashes, shadows, or reflections, and so forth. For example, an eye image can be included in an image of the face of a wearer or can be an image of the periocular region of the wearer. To perform iris segmentation, both the boundary of the pupil (the interior boundary of the iris) and the limbus (the exterior boundary of the iris) can be determined as separate segments of image data. When used in conjunction with outside-world images (e.g., as obtained by an imaging system directed outwards from a wearable display system 710), correlations over time can be made with the eye image to indicate or detect dynamic eye features (e.g., eye movements, eye patterns, eye fixations, eye focus information, pupil dilation, or eye browsing histories).

Further, as another example of processing biometric information (e.g., an eye pose), the eye movements of a user of a computer can be tracked. For example, a camera coupled to a monitor of the computer can provide images for identifying eye movements. However, the cameras used for eye tracking are some distance from the eyes of the user. For example, the camera may be placed at the top of a user's monitor coupled to the computer. As a result, the images of the eyes produced by the camera are, often, produced with poor resolution. Accordingly, processing biometric information from a user may present challenges.

Eye images can be used for eye pose identification. Iris features can be utilized for identification or verification of a wearer. As another example, a biometric operation can process eye images to generate or detect eye movements, eye patterns, eye fixations, eye focus information, pupil dilation, or eye browsing histories. As yet another example, eye images can be used to generate an iris code. The generated iris code can be used for a comparison to an iris code database where iris codes of various wearers are stored.

The biometric information exchange system 705 can be communicatively connected to a wearer data store 730. The wearer data store 730 can generally include any repository, database, or information storage system that can store biometric information of a wearer. Wearer data can be any type of biometric information including, but not limited to, eye movements, eye patterns, eye fixations, user activity information (e.g., a user's past purchases history, eye browsing history, select-through history or click-through history, blink-through history, ratings history, page requests, additions or removals of items to wish lists and shopping carts, user interface events, tagging activity, combinations of the same, and the like), and user characteristics. User characteristics can include demographic information (e.g., age, gender, geographic location, occupation, income, home address, shipping address, spending levels, interests, hobbies, preferences, settings, combinations of the same, and/or the like). The wearer data store 730 can, at least in part, be included in data storage in or associated with the wearable display system 710. For example, the wearable data store 730 can be included in the local data module 224 and/or the remote data repository 232.

In yet other embodiments, the biometric information exchange system 705 utilizes item data retrieved from an item catalog 735 (as well as the aforementioned eye movements and eye browsing history, for example) to generate an offer for a biometric exchange. Item data for an item can include item details (e.g., name, type, description, price, category, etc.), images, relationships to other items, item ratings, wearer reviews, author pages, user-generated list pages, forum pages, blog pages, and the like. Item catalog 735 can also be referred to as an electronic catalog. Such an offer can appear on display pages 800b and 800d generated by the biometric information exchange system 705, as described below with reference to FIGS. 8B and 8D.

The data stores of operating environment 700 can correspond to any physical data store, collection of physical data stores, or virtual data store implemented by one or more physical data stores, such as hard disk drives (HDDs), solid state drives (SSDs), tape drives, network attached storage (NASs) or any other persistent or substantially persistent storage component. In addition, the item catalog 735 and the wearer data store 730 can be located on the same physical data store accessible to the biometric information exchange system 705 or on different physical data stores. In some embodiments, the item catalog 735 and the wearer data store 730 can be maintained by the biometric information exchange system 705 or maintained by another network site accessible via the network 720 or one or more web services accessible via various application program interface calls made by the biometric information exchange system 705.

In addition to the item catalog 735 and wearer data store 730, the operating environment 700 can include one or more wearable display systems 710 that communicate with the biometric information exchange system 705 via the network 720. Although the present disclosure refers to specific examples or depictions of wearable display system 710, such as the wearable display system 200 shown in FIG. 2 or the display systems 200 in FIGS. 4 and 6, embodiments of the present disclosure can be utilized by any variety of head mounted display devices capable of obtaining biometric information and/or a computing device capable of displaying offers (e.g., offers 820, 832 shown in FIGS. 8B and 8D) to a wearer of the wearable display system 710. Such computing devices include, but are not limited to, laptops, personal computers, kiosks, thin clients, tablet computers, personal digital assistants (PDAs), hybrid PDA/mobile phones, mobile phones, electronic book readers, digital media players, wearable computing devices, integrated components for inclusion in computing devices, appliances, electronic devices for inclusion in vehicles or machinery, gaming devices, set top boxes, electronic devices for inclusion in televisions, and the like. These computing devices can be associated with any of a number of visual, tactile, or auditory output devices, and can be associated with a number of input devices for user input, including, but not limited to, keyboards, microphones, mice, trackballs, trackpads, joysticks, input tablets, trackpoints, touch screens, remote controls, game controllers, motion detectors and the like. In some embodiments, multiple devices can be utilized in conjunction to facilitate displaying offers to a wearer of the wearable display system 710. For example, a first device (e.g., the wearable display system 200 shown in FIG. 2) can initially display a consent request and provide a response determined by server hosting a network website and/or implementing a biometric information exchange system 705; and a second device (e.g., a tablet device with a browser-based application) can provide a display of the offers provided by the biometric information exchange system 705. For example, the second device can display the display pages 800a-800e illustrated in FIGS. 8A-8E. Accordingly, reference to a user computing device within the present disclosure can include multiple computing devices working in conjunction to facilitate obtaining biometric information and providing offers to a wearer regarding the biometric information.

The network 720 can be a wired network, wireless network, or any combination thereof. The network 720 can be a personal area network, local area network, wide area network, cable network, satellite network, cellular telephone network, or a combination thereof. In the illustrative operating environment 700 of FIG. 7, network 720 is a global area network (GAN), such as the Internet. Protocols and components for communicating via the other aforementioned types of communication networks are known to those skilled in the art of computer communications and thus, need not be described in more detail herein.

Example of Biometric Exchange Techniques

Biometric exchange techniques, routines, or methods can be accomplished via a wearable display system 710 capable of obtaining biometric information. To obtain the biometric information for a biometric exchange routine, the eyes of the wearer of a mixed reality display device (MRD) (e.g., the wearable display system 200 shown in FIG. 2 or the display systems 400 in FIGS. 4 and 6) can be imaged using the inward-facing imaging system 452 (see, e.g., FIG. 4). A set of eye images obtained by the imaging systems 452, 454 coupled to the wearable display system 710 can be used in a biometric information exchange. As described herein, a set of eye images includes eye images from the inward-facing imaging system 452. The outward facing imaging system 454 can obtain outside-world images of the outside world, including those in the direction in which the wearer's eyes are looking. Eye images captured by the inward-facing imaging system 452 can be processed to determine eye poses (e.g., direction of the wearer's eye or eyes), generate iris codes, determine pupil sizes, detect eye patterns, detect eye movements, detect eye fixations, or process eye focus information. Computer vision techniques can be processed using computer vision techniques. Eye images can be stored as part of a browsing history of an eye (also referred to as an eye browsing history).

Illustratively, in the context of a wearable display system 710 (e.g., the wearable head mounted display 200), cameras may be closer to the user's eyes than a camera coupled to a user's monitor. For example, cameras may be mounted on the wearable display system 710, which itself is worn on a user's head. The proximity of the eyes to such cameras can result in higher resolution eye images. Accordingly, computer vision techniques can be used to extract features from the user's eyes, particularly features of the iris (e.g., an iris feature) or in the sclera surrounding the iris (e.g., a scleral feature). For example, when captured by a camera near the eye, the iris of an eye can show detailed structures. Such iris features are particularly pronounced when observed under infrared illumination and can be used for biometric identification. These iris features are thought to be unique from user to user and, in the manner of a fingerprint, can therefore be used to identify the user uniquely. Eye features can include blood vessels in the sclera of the eye (outside the iris), which may also appear particularly pronounced when viewed under red or infrared light. Such distinctive iris features, viewed at a higher resolution, may lead to more unique or accurate iris codes generated for various eye pose images.

The local processing and data module 224 and/or the remote data repository 232 can store image files, video files, or image audio and video files. For example, in various implementations, the local processing & data module 224 and/or the remote data repository 232 can store eye images to be processed by the local processing & data module 224. The local processing and data module 224 and/or the remote processing module 228 can be programmed to use the biometric exchange techniques disclosed herein in biometric information exchanges, for example to identify or authenticate the identity of the wearer 204 when offering a biometric exchange, or in obtaining biometric information, for example to process biometric information for a biometric exchange when a consent indication of the wearer has been received. Accordingly, the processing modules 224, 228 can be caused to execute aspects of biometric exchange techniques. Additionally, or alternatively, the controller 450 can be programmed to cause to execute aspects of the biometric exchange techniques.

Processing biometric information for a biometric information exchange can occur in a variety of ways. As but one example, the imaging systems 452, 454 can capture video for a particular application (e.g., video of the wearer's eye for an eye-tracking application or video of a wearer's hand or finger for a gesture identification application). The video can be analyzed using biometric information processing techniques by one or both of the processing modules 224, 228. For example, the processing modules 224, 228 can analyze a set of eye images (e.g., both eye images and corresponding outside-world images) to detect eye patterns or eye fixations of the wearer of the wearable display system 200. With this analysis, the processing modules 224, 228 can perform a biometric information exchange. As an example, the local processing and data module 224 and/or the remote processing module 228 can be programmed to store obtained eye images from the imaging systems 452, 454. In addition, the local processing and data module 224 and/or the remote processing module 228 can be programmed to process the set of images using the techniques described herein (e.g., the routine 900) and to transmit biometric information of a wearer of the wearable display system 200 based on a consent category that the wearer has indicated agreement. In some cases, off-loading at least some of the biometric exchange techniques to a remote processing module (e.g., in the "cloud") may improve efficiency or speed of the computations. For example, a remote processing module may perform a biometric data operation on the set of eye images to obtain biometric information.

As described above, a biometric information acquirer computing device 715 can obtain biometric information retrieved from a wearable display system 710 utilized by a wearer of that system in a biometric exchange. For example, the wearable display system 710 can utilize a biometric information exchange system 705. To obtain biometric information in a biometric information exchange performed by the wearer of the wearable display system 710, a consent request can be first transmitted to a wearer of the wearable display system 710. Once a consent request is received, a wearer can respond to the consent request with an indication that an agreement to share an aspect of biometric information is allowed with the wearable display system 710 utilized by the wearer. A consent request can be transmitted in various formats or display mechanisms. For example, the wearable display system 710 can display the consent request to the wearer. As another example, a consent request can be transmitted to the wearer of the wearable display system 710 via a display page or a content page (e.g., a webpage) displayed to the wearer. As illustrated in FIGS. 8A-8E, consent requests can vary in the amount and type of access of a wearer's biometric information a biometric information acquirer computing device 715 can obtain. As described herein, biometric information is only shared with a biometric information acquirer computing device 715 utilizing the biometric information exchange system 705, when a consent request has been transmitted to the wearer in a response including a consent indication from the wearer has been received.

A consent request can include a request for categories of biometric information obtained from the wearable display system 710 for an acquisition by a biometric information acquirer computing device 715. For example, a consent request for a set of eye images can be transmitted to a wearer of the wearable display system 710 for acquisition by a specific computing device associated with a specific acquirer. As another example, a wearer can consent to share eye movements obtained from eye images captured by an image capture device coupled to the wearable display system 710, but not to skin sensing detected by the wearable display system 710 (e.g., electrodermal activity detected by a galvanic sensor). The wearer may have indicated agreement to an eye movement category, but not agreed to a skin sensing activity category. Additionally or alternatively, consent requests can include a request to access specific sensors or devices coupled to the wearable display system 710 (e.g., via local processing module 224). For example, the consent request can indicate that access is requested for a GPS sensor to determine location, but specify that other sensors may not be accessed (e.g., blood pressure sensors).

Consent requests can be in various forms or formats. Some consent requests can request that a wearer of the wearable display system 710 be provided offers regarding biometric information exchanges, without obtaining any biometric information from the wearable display system 710. Other consent requests can each request that all biometric information regarding a certain item be shared with a particular biometric information acquirer computing device 715 for a particular exchange rate facilitated by the biometric information exchange system 705. As but one example, the biometric information acquirer computing device 715 can request consent for access to obtained biometric information (e.g., biometric information obtained during a certain time period or for a particular type of biometric information) via the wearable display system 710. The access for the biometric information may be for a particular item. In turn, the biometric information acquirer computing device 715 can provide a promotional item for the access to the biometric information regarding the particular item. Such an example exchange can be referred to as a wearer biometric exchange at a certain exchange rate. Additionally or alternatively, consent requests can each request certain behavioral characteristics regarding the wearer of the wearable display system 710. An intent regarding an action, such as intent to purchase, may be viewed as a behavioral characteristic, which may also be exchanged in biometric exchanges as described further below. Accordingly, a wearer may be presented with a consent request regarding a particular behavioral characteristic (e.g., intent to purchase certain types of items) so that a biometric information acquirer can obtain such processed behavioral characteristics from a wearable display system 710.

VR and AR experiences provided by a wearable display system 710 can facilitate consent requests. For example, when a wearer is utilizing a wearable display system 710 and views a particular widget, a mixed reality experience can facilitate the consent request. An augmented reality scene can be displayed that includes a consent request. As but one example, while the user is viewing a peanut butter jar in a retail store, an augmented reality scene with different brands of peanut bar jars (e.g., a competitor peanut butter brand) can be displayed in an augmented reality scene. The consent request can indicate that the biometric information requested are eye images obtained while the user utilizes the wearable display system 710 when viewing the different brands of peanut butter jars. Accordingly, as described herein, consent requests can take a variety of formats in presentation to the wearer of the wearable display system 710.

As described below, a wearer can indicate consent to sharing or accessing of biometric information for a biometric information acquirer computing device 715 by selecting the Allow button 808 or icon. For example, in one implementation, the wearer can blink with an eye directed to the Allow button 808 to select that button, thereby indicating consent to the textual content associated with the Allow button 808. As another example, the wearer can select the Allow button 808 using a gesture. Visual commands such as a blink at a certain direction or a gesture can be determined using one or more computer vision techniques. Additionally or alternatively, consent requests can be filtered according to the certain types of biometric information that the wearer may have indicated an interest in or permission to sharing. For example, only certain pop-up icons may appear regarding respective consent categories to which the wearer has indicated an interest in or permission to sharing. Other examples of filtering consent requests are described further below with reference to FIG. 8B.

As an example, a wearer can apply one or more filters to incoming offers via a user interface control panel that can be accessed (e.g., "nothing under $5" or "nothing that requires my GPS location", etc.). When an offer arrives, it can be filtered, and presented to the wearer only if it meets the filter condition(s). To reduce clutter in the user interface, the system can present the offer to the wearer by a unique icon that indicates the existence of the offer. The wearer can select the icon to accept the offer, and the system can automatically obtain (or begin to obtain) the biometric information, provide it to the offeror, and compensate the wearer. Such example embodiments are, in effect, a type of "one-click," "one-permission," "one-selection," or "one-interaction" biometric exchange, in which the wearer can easily select a filtered offer with minimal interaction. In some such examples, the wearer may not even need to select the icon if the offer meets the wearer's filters. As an example, the wearer can pre-filter offers from a supermarket the wearer shops at to permit the supermarket (for an appropriate price) to determine what items the wearer looks at, which of those items the wearer actually selects for purchase (e.g., by placing the item in a shopping cart), how much time the wearer spends in different aisles of the store, etc. Whenever the wearer enters the supermarket, the wearable display system 710 can (optionally) display the offer icon and begin the exchange of the wearer's biometric information without further interaction from the wearer. Continuing with this example, an advantage of optionally displaying the offer icon, when the wearer enters a certain location, is that the wearer can reject the offer icon by indicating that objection via the wearable display system 710. For example, the wearer can verbally or audibly object to the offer via a microphone coupled to the wearable display system 710 (e.g., saying "No, I don't want that"). As another example, the wearer can object to the offer using visual commands (e.g., blinking an eye towards the "Don't Allow" button 812). Accordingly, the wearer can disallow access to biometric information for that particular visit to that location, while exchanges of the wearer's biometric information can still begin without further interaction from the wearer on subsequent visits to that location, if the wearer does not object the displayed offer icon during one or more subsequent visits.

A computer vision module can implement one or more computer vision techniques. The computer vision module can determine the wearer's visual commands, such as an eye blink at a certain direction or any direction, or a gesture (e.g., with one or both hands, or one or more objects). The computer vision module can determine an object, a person, or a scene the wearer is looking. Non-limiting examples of computer vision techniques include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

A speech recognition module can implement one or more speech recognition techniques. The speech recognition module can determine the wearer's verbal or audio commands (e.g., saying "Yes" or "No). A speech recognition technique can be based on machine learning, such as long short-term memory (LSTM) recurrent neural networks (RNNs). The speech recognition technique can be based on Hidden Markov Models (HMMs), dynamic time warping (DTW)-based speech recognition, machine learning, or end-to-end automatic speech recognition. Machine learning techniques for speech recognition can be based on neural networks, such as long short-term memory (LSTM) recurrent neural networks (RNNs), time delay neural networks (TDNNs), or deep forwarding neural network (DNN), or recurrent neural networks (RNNs).

The speech recognition techniques and the computer vision techniques can additionally or alternatively be performed by a variety of machine learning algorithms. Once trained, the machine learning algorithm can be stored by the wearable display system 710. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable display system 710 can be configured to utilize a plurality of techniques to generate models for analysis of the aggregated data. Other techniques may include using pre-defined thresholds or data values.

Example Display Pages

For purposes of illustration in the figures, the fictitious name "biometricexchange.com" is used in the display pages to refer to the network site hosted by the biometric information exchange system 705. In addition, the fictitious names William Wearer and Adam Acquirer are used to refer, respectively, a particular wearer of a wearable display system 710 and a biometric information acquirer computing device 715.

FIGS. 8A-8E illustrate examples of the format and content of representative display content pages or display pages (e.g., webpages) in which a biometric information exchange system 705 exchanges information between wearable display system 710s and computing devices of potential acquirers of biometric information of the wearer. For purposes of illustration, the representative display pages are presented as they may appear, for example, in a web browser displayed by a wearable display system 710. Although the examples illustrated in FIGS. 8A-8E are represented as webpages, this is for illustration and is not intended to be limiting. In other implementations, the content of the biometric information exchange system 705 can be presented in other formats by the wearable display system 710, such as via an application (e.g., an "app") that may be executing on processing modules 224, 228. For example, in one embodiment, a popup (or an alert, a modal/dialog, a flash notice/growl notification, a lightbox/theatre, a popover/tooltip/hovercard, or any combination there) may be presented to the wearer that includes a portion of the content of the biometric information exchange system 705 (e.g., an icon indicating a consent request for biometric information). In some embodiments, the content of a display page can be integrated seamlessly into a scene shown to a wearer (e.g., the augmented reality scene 100 shown to a wearer of the wearable display system 200 shown in FIG. 2 or the display system 400 in FIGS. 4 and 6).

Figure 8A:
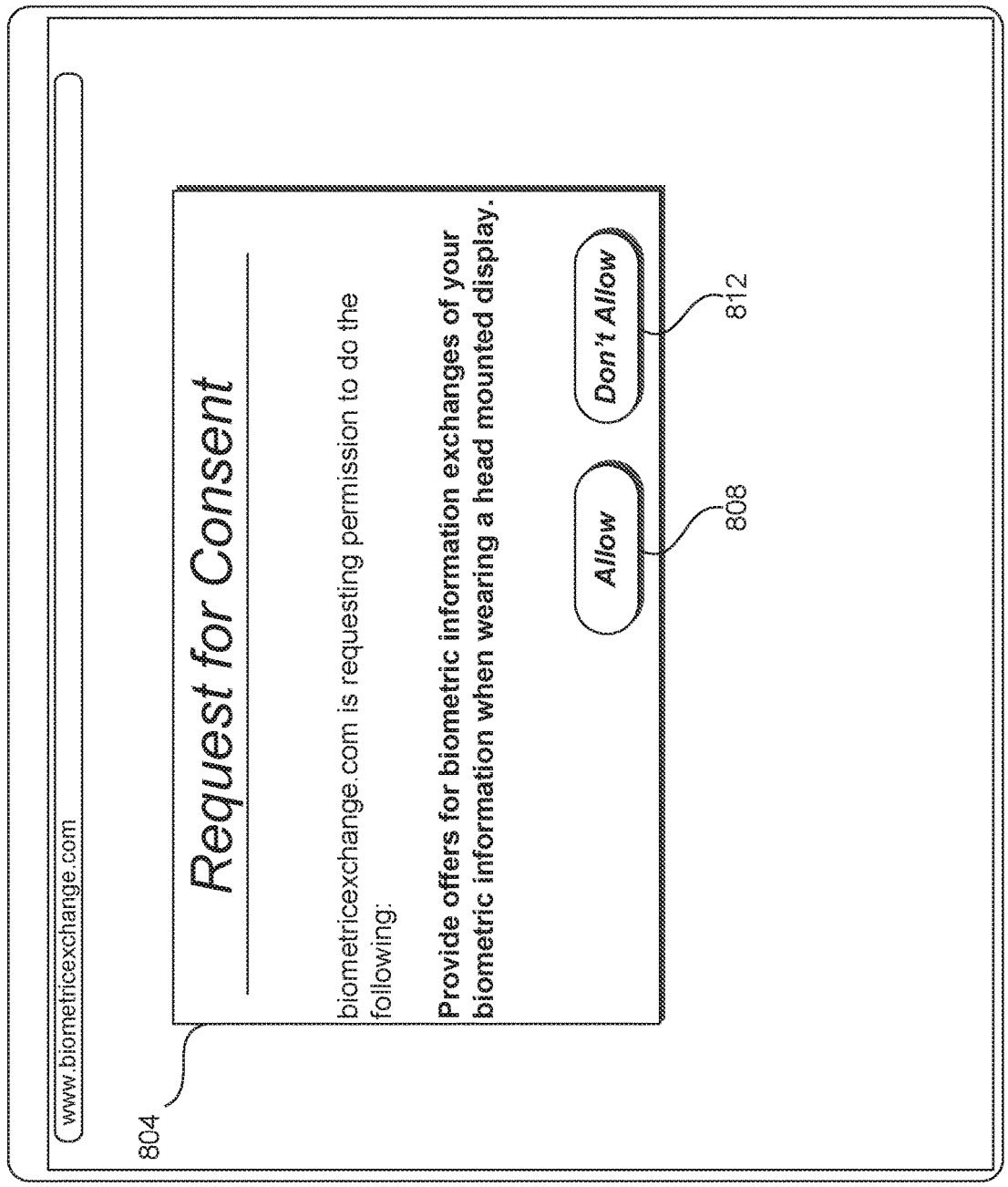
FIG. 8A illustrates an example display page that generated by a biometric information exchange system for a wearer of a wearable display system to provide consent for viewing offers of biometric information.

FIG. 8A illustrates an example display page 800a that generated by a biometric information exchange system 705 for a wearer of a wearable display system 710 to provide consent for viewing offers of biometric information. As illustrated, before even accessing the display page 800a of biometricexchange.com, a popup may be displayed on the display page 800a of FIG. 8A during the process in which a wearer provides consent to the biometric information exchange system 705 to connect to that system. In this illustrative example, William can be presented with a popup 804 that may be displayed over the display page 800a, which requests permission from William to connect his wearable display system 710 to the biometric information exchange system 705. The popup 804 describes the actions the biometric information exchange system 705 can take if William consents to connecting his wearable display system 710 with the biometric information exchange system 705. If William decides not to consent, William can click or select the Don't Allow button 812, and the biometric information exchange system 705 may not attempt to connect or link William's wearable display system 710 to the biometric information exchange system 705. In this situation, the wearer's social networking information remains private and unavailable to the biometric information exchange system 705.

If William decides to consent, then William can select the Allow button 808 to indicate that an agreement regarding an aspect of biometric information. As illustrated, in this example, William indicates that he agrees to receive offers for his biometric information and biometric information exchanges. By selecting the Allow button 808, William has provided a consent indication regarding offers for biometric information exchanges, and can access biometricexchanage.com. If William is not or has not created an account with the biometric information exchange system 705, the biometric information exchange system 705 may prompt William to create an account on the biometric information exchange system 705. For example, the biometric information exchange system 705 can use a popup (not shown) that allows William to enter his authentication credential (e.g., a username and password or an iris code) so that the biometric information exchange system 705 can be authorized to access William's biometric information from the wearable display system 710. The popup 804 can also include a description of the biometric information exchange system's policy to protect the privacy of a wearer's personal data and a description of how the wearer can use the Allow button 808 and the Don't Allow button 812 functionalities.

In some implementations, VR, AR, or MR experiences provided by a wearable display system 710 can facilitate the presentation of biometric information exchange offers, once a consent indication has been determined from the response of the wearer of the wearable display system 710. For example, when William is utilizing a wearable display system 710 and views a particular widget, an AR experience can facilitate the consent request. An augmented reality scene can be displayed that includes a consent request. As but one example, while the user is viewing an item at a physical location, an augmented reality scene with a similar item but a different type (e.g., a different brand of the item) can be displayed in an augmented reality scene. The consent request can indicate that biometric information is requested of eye images obtained while William may be utilizing the wearable display system 710 for viewing these types of items. In another implementation, the consent request can indicate that only one aspect of biometric information is to be processed from obtained eye images, as described further below with reference to FIG. 8C. For example, the consent request can indicate that eye patterns while viewing those specific types of items can be transmitted to biometric information exchange system 705 to receive offers for that biometric information at a certain exchange rate.

Figure 8B:
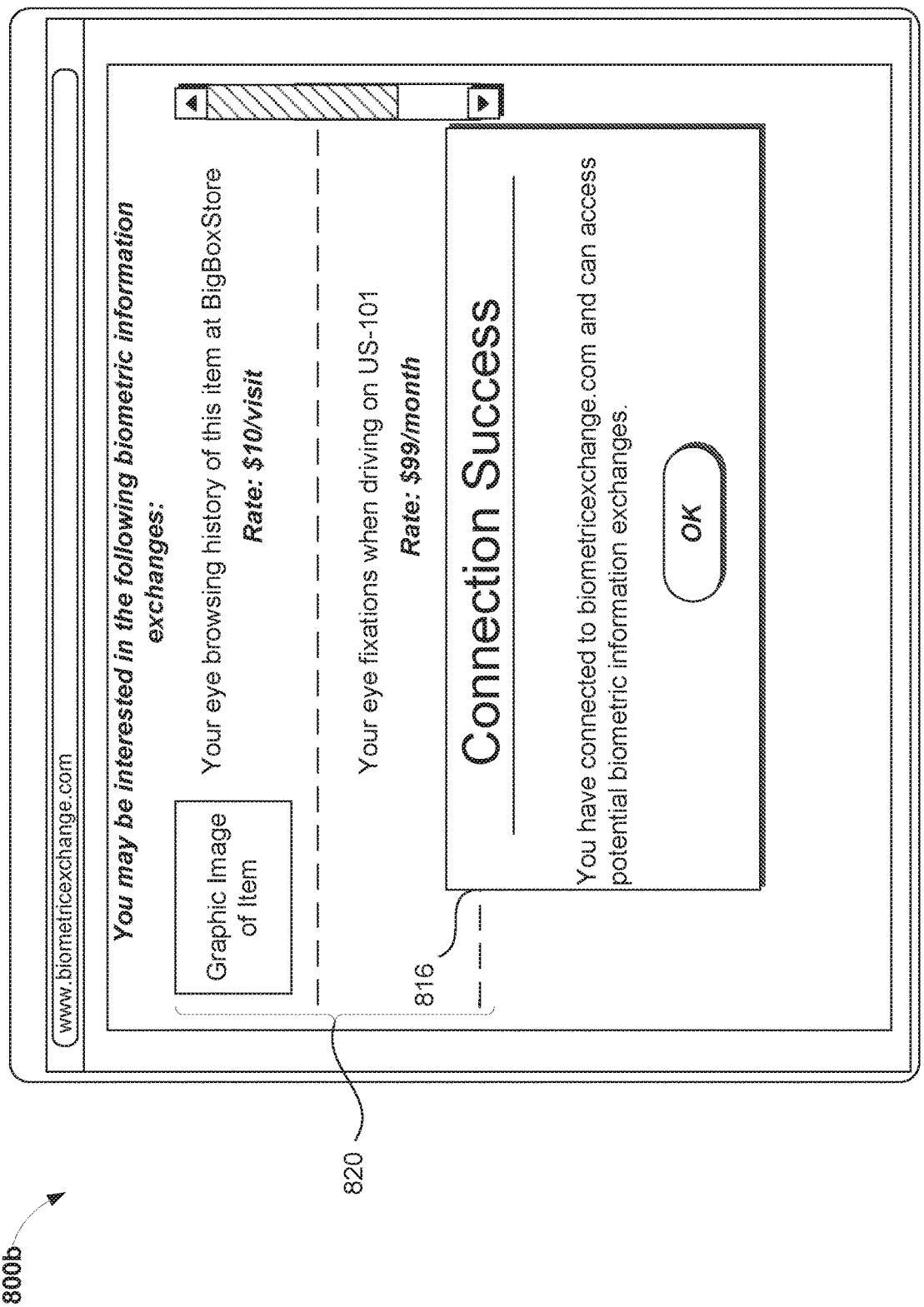
FIG. 8B illustrates an example display page generated by the biometric information exchange system and a corresponding popup that can be displayed on that example display page when a wearer consents to view offers provided by the biometric information exchange system, as initiated in FIG. 8A.

FIG. 8B illustrates an example display page 800b generated by the biometric information exchange system 705 and a corresponding popup that can be displayed on that example display page 800b when a wearer consents to view offers provided by the biometric information exchange system 705, as initiated in FIG. 8A. After the connection has been made by the biometric information exchange system 705, William may be presented with a popup 8216 that indicates the connection has been successfully made. In one implementation, the biometric information exchange system 705 can use API calls to the processing modules 224, 228 of the wearable display system 710 to establish the connection between William's wearable display system 710 and the biometric information exchange system 705. For example, with William's consent, the biometric information exchange system 705 can use William's authentication credentials (e.g., username and password) to automatically sign-in to the biometric information exchange system 705 for William. In another implementation, if William has a profile associated with the wearable display system 710 stored in the data repository 232, the biometric information exchange system 705 can retrieve William's profile from the data repository 232 and utilize that profile for providing biometric exchange offers. As described above with reference to FIG. 7, the biometric information exchange system 705, which can be hosted by a server computing device, can form a secure connection 725 between the wearable display system 710 and the biometric information acquirer computing device 715. Accordingly, the secure connection 725 hosted by the biometric information exchange system 705 can facilitate a biometric exchange between a wearer of the wearable display system 710 and the biometric information acquirer computing device 715.

Figure 8C:
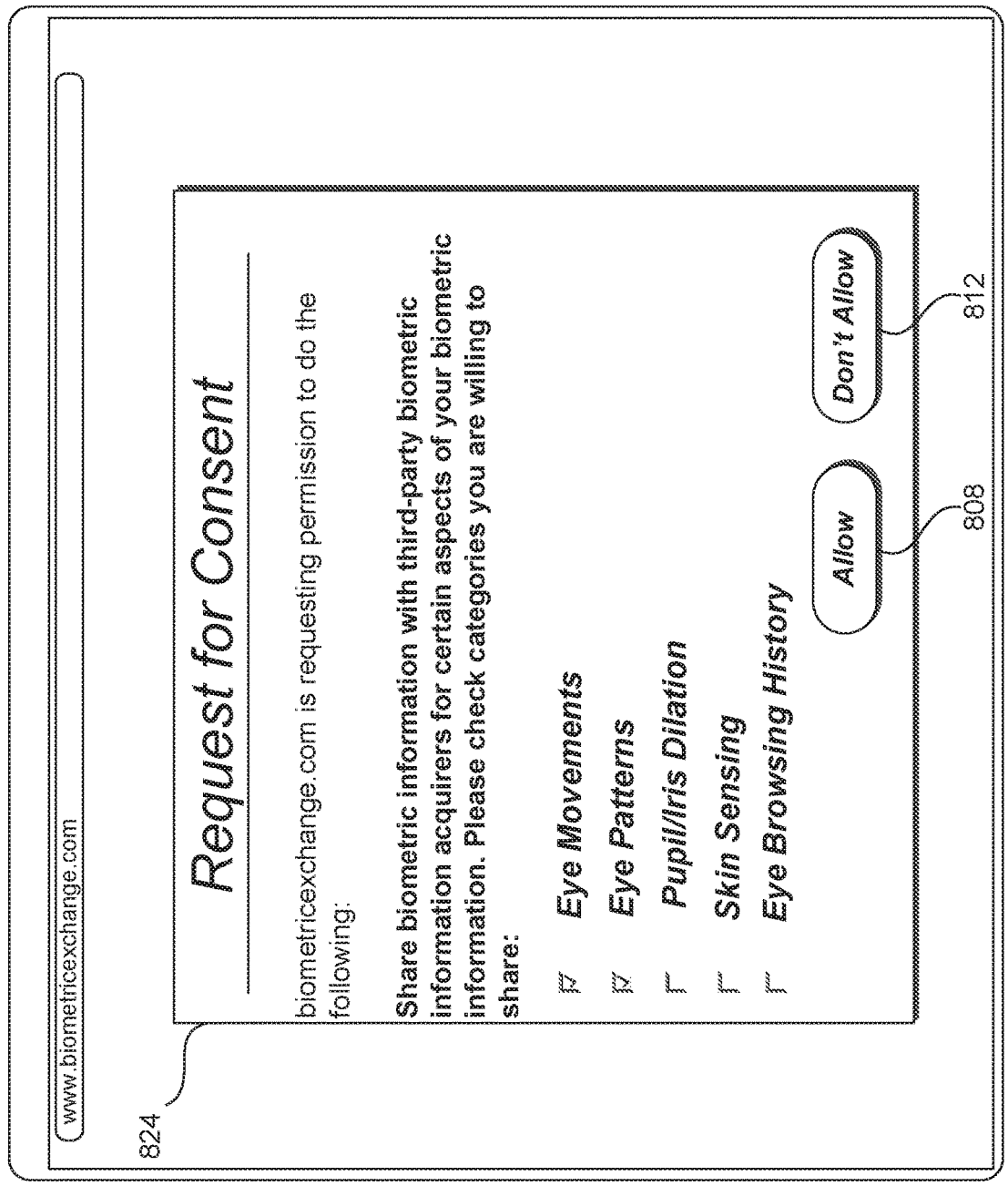
FIG. 8C illustrates an example display page that generated by a biometric information exchange system for a wearer to provide consent for receiving offers regarding certain categories of biometric information of the wearer.
Figure 8D:
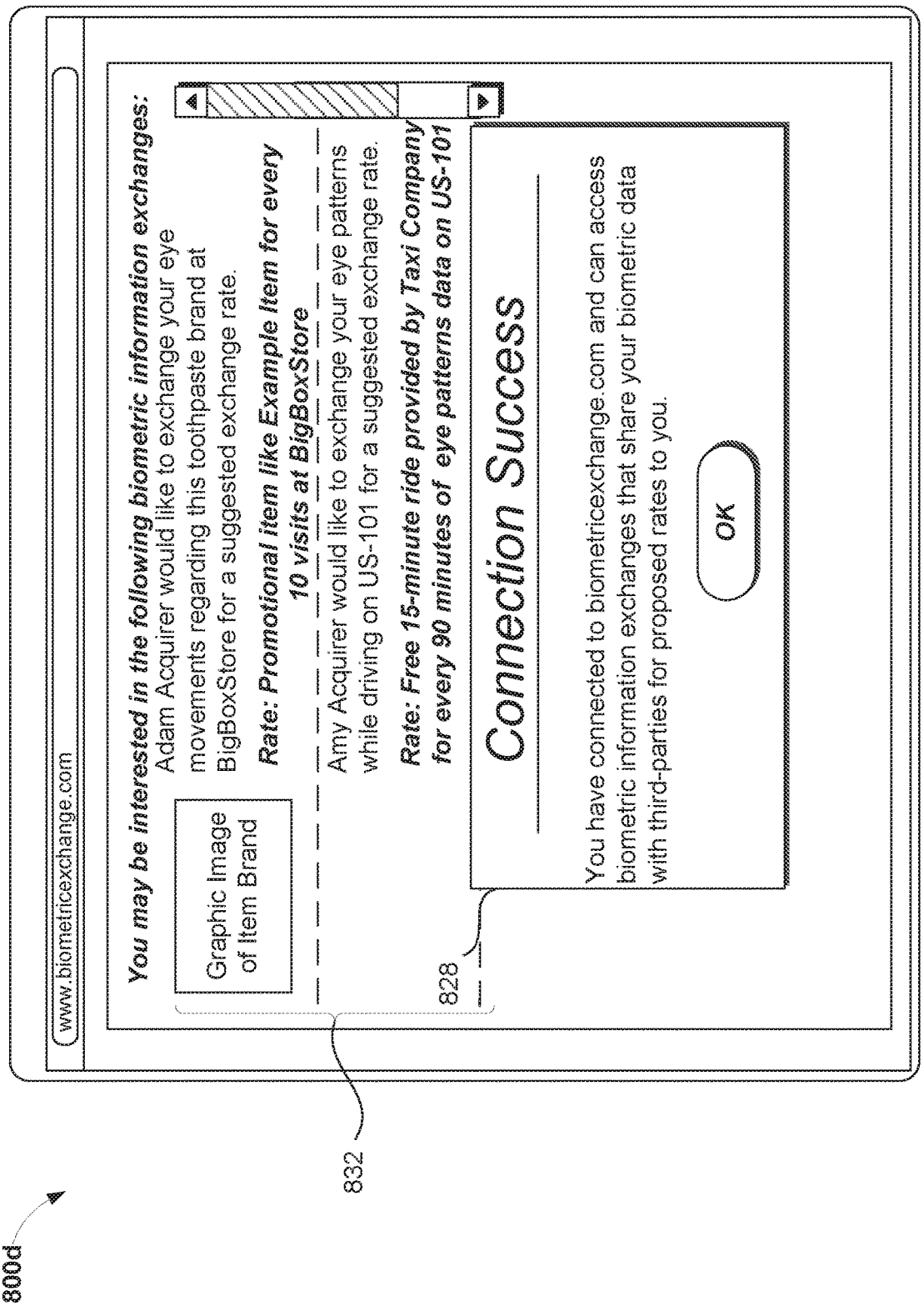
FIG. 8D illustrates an example display page generated by the biometric information exchange system and a corresponding popup that can be displayed on that example display page when a wearer consents to receive offers regarding certain categories of biometric information with the biometric information exchange system, as initiated in FIG. 8C.
Figure 8E:
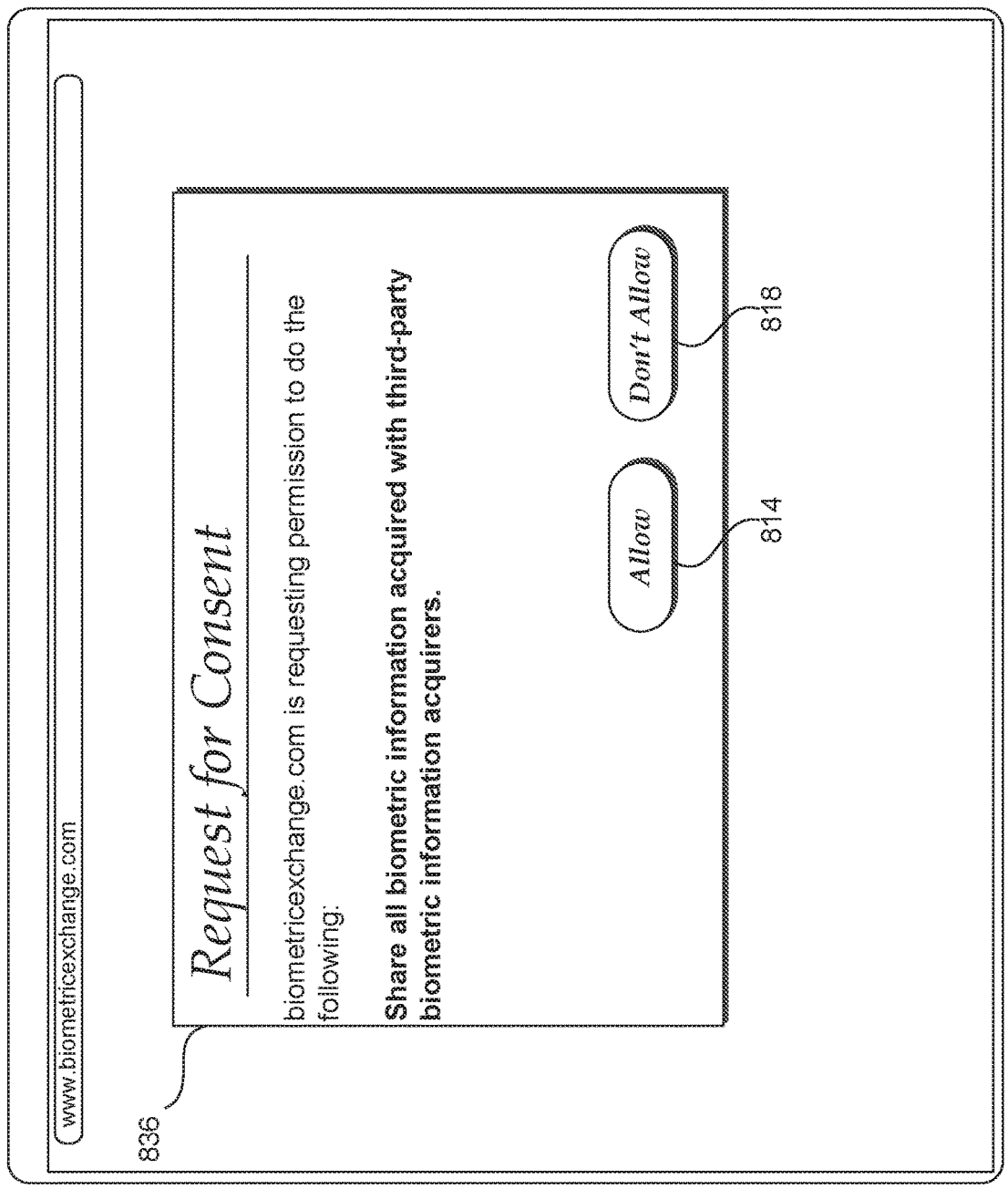
FIG. 8E illustrates an example display page generated by a biometric information exchange system for a wearer to provide consent for sharing biometric information of the wearer.

With a secure connection 725 to the biometric information exchange system 705, the display page 800*b* can display offers 820 for biometric information exchanges. As illustrated, the offers 820 include descriptions of biometric information obtained by the wearable display system 710 for certain biometric exchange rates. As an example offer 820, the eye browsing history of a particular item at an example BigBoxStore (or any retail establishment or show room, whether online or brick and mortar) can be exchanged with a biometric information acquirer computing device 715 for an exchange rate of $10 per visit. Accordingly, each visit by William utilizing the wearable display system 710 to the BigBoxStore can be exchanged on the biometric information exchange for $10, when eye browsing history related to the example item is obtained by the wearable display system 710. As another example offer 820, the eye fixations of William when driving on US-101 can be exchanged for an exchange rate of $99 per month, while William utilizes the wearable display system 710 when driving on US-101. Accordingly, William can view offers 826 displayed on the display page 800*b*, without necessarily consenting to a particular exchange. As illustrated in FIGS. 8C-8E, different categories of consents can be agreed to by William based on consent requests for biometric information from the biometric information exchange system 705. As illustrated in FIGS. 8A-8B, William has consented to a basic level of consents that only allows the biometric information exchange system 705 to provide offers regarding William's biometric information to William.

Displaying the offer 820 on the display page 800*b* can be implemented in conjunction with a filter or with different display settings. For example, William can select filters (not depicted in FIG. 8B) to automatically exclude certain offers. For example, William can choose a filter that automatically excludes offers under $1. As another example, William can choose a filter that automatically excludes offers that relate to his eye fixations. In one implementation, William may be able to see offers that he is actually not eligible to select. For example, he may be able to see offers for eye fixations when driving US-101, even though William does not reside in an area near US-101. In such a case, such an offer may have been provided by a biometric information acquirer computing device 715 that seeks to acquire biometric information related to wearer's driving near US-101. Additionally or alternatively, a filter can be used to include certain offers that a user may be interested in selecting.

As another display setting, exchange rates can be displayed in a different currency, as opposed to the US dollar rates displayed in FIG. 8B. For example, exchange rates can be expressed in a virtual currency or a cryptocurrency (e.g., BitCoin) or some other transaction medium (e.g., reward points) designated by the biometric information exchange system 705. In such a case, another currency can be used for various other exchanges on the biometric information exchange system 705, without actually acquiring that currency in US dollars through a financial medium. Accordingly, the biometric information exchange system 705 can perform exchanges in an exchange medium customized for biometric information exchanges.

Various biometric information exchange offers are possible. With William utilizing a wearable display system 710, a biometric information acquirer can provide a variety of offers via the biometric information exchange system 705 to William Wearer. As described above, a wearable display system 710 can obtain eye images to detect or process dynamic eye features. Dynamic eye features can include eye movements, eye patterns, eye fixations, eye focus information, pupil dilation state, or eye browsing history. Additionally, outside-world images (e.g., as captured by imaging system 454) can also be used for a variety of offers based on demographics or location. For example, images from the wearable display system 710 obtained while in a retail store can indicate the demographics of that retail store. As but one example, images of the retail store while the wearer is browsing can indicate that the majority of the population of the retail store is less than 30 years in age. Accordingly, a biometric information acquirer computing device 715, having obtained such images, may offer items popular to that age demographic in that retail store. As another example, the demographic of people browsing a particular department in the retail store can also indicate an interest level of that demographic for the types of items themselves. For example, images obtained from a wearer in a retail store during an afternoon time period can indicate that men primarily browse the grocery section during that time. Accordingly, a biometric information acquirer computing device 715, having obtained such images, may offer advertisements or offers 820 to men in the grocery section of that retail store during that time period. A biometric information acquirer computing device 715 can use biometric information for related biometric information activities or projects. Accordingly, the system described herein can provide eye images and/or outside-world images to a biometric information acquirer computing device 715 utilizing the biometric information exchange system 705 to connect with the wearer's associated wearable display system 710 (e.g., the wearable display system 200).

The wearable display system 200 utilizing the processing modules 224, 228 or the biometric information exchange system 705 can process the obtained biometric information from the wearer utilizing the wearable display system 200. For example, eye images may be processed to obtain biometric characteristics regarding the wearer. As an example of processing eye images, eye images can be analyzed for an intent of an action on an item based on pupil dilations, the pointing direction of the eyes, or eye fixations. Illustratively, while the user is viewing multiple peanut butter jars in a retail store (e.g., as analyzed from a set of images associated with the item), the time duration of an eye fixation on a certain brand of the peanut butter jar can indicate an intent to purchase. Pupil dilations of the wearer can confirm an intent to purchase that peanut butter jar, for example, indicating that a pupil of the wearer dilated while viewing the peanut butter jar. Or as another example, after viewing the initial peanut butter jar for a certain period of time, the eye images can indicate that the eyes have moved to another peanut butter jar of a different brand. For example, the corresponding outside-world images can be used to correlate eye fixations with particular items viewed by the wearer. Such a pattern of eye fixations can indicate that the initial peanut butter jar may be purchased. Purchase data from a point-of-sale transaction at a register can indicate that this purchase did in fact occur. Conversely, the final purchase data can be used to infer an intent of a wearer' while purchasing peanut butter jars. For example, the final purchase of the initial peanut butter jar can indicate that a wearer has a higher probability of viewing the item that was in the final purchase for a longer duration than competitor brands of that same item brand. Biometric information obtained regarding the skin of the wearer (e.g., as detected by a galvanic sensor system coupled to the wearable display system 710) can also be used to infer an intent of an action (e.g., a behavioral characteristic) for an item. As an example of such a galvanic sensor system, a detection of a wearer's sweat by the galvanic sensor system can indicate that the wearer is interested in purchasing an item at a retail store.

Although this example has been described with reference to analyzing the images of peanut butter jars at a retail store and the detection of the wearer's sweat, additional biometric characteristics of the wearer can be deduced or processed from data acquired by the wearable display system 710. In various implementations, any data acquired from a wearable display system 710 may be captured, deduced, process, or determine behavioral characteristics. For example, as described above with reference to FIG. 2, data acquired by local processing module 224 can include data captured from sensors (which may be, e.g., operatively coupled to the frame 212 or otherwise attached to the wearer 204), such as image capture devices (such as cameras), microphones, inertial measurement units, accelerometers, compasses, gyroscopes, position sensors (e.g., GPS sensors), radio devices, voice detectors, galvanic sensors, pulse or blood pressure sensors, electrocardiographic sensors, and/or electroencephalographic sensors.

The correlation of information obtained from the processing of eye images, outside-world images, and any other data obtained from the wearable display system 710 can be used to determine or infer behavioral characteristics of the wearer (e.g., purchasing the item). As another example of processing a behavioral characteristic from eye images, eye images that indicate the wearer is entering an automobile and eye images indicating that the wearer has buckled a seatbelt can all be processed to determine a time it takes the wearer to put on her seatbelt after entering the car. Such a time for seatbelt action could be exchanged as a behavioral characteristic of the wearer with an automobile manufacturer, an automobile safety organization, an automobile insurance company, or a motor vehicle division. Additionally or alternatively, in the aggregate, behavioral characteristics of various wearers can be processed or inferred from the aggregate data obtained from several wearable display systems 710. Such aggregated behavioral characteristics can also be processed or analyzed to obtain behavioral characteristics for certain demographics or types of wearers (e.g., drivers of family vehicles or drivers of sports vehicles). In some cases, the entity requesting the biometric information can provide the biometric information exchange system 705 with processing algorithms or software (which may remain proprietary to the entity) that the biometric information exchange system 705 uses to process the aggregated biometric information on behalf of the entity.

In some implementations, the signage associated with an item may be the focus of an analysis, rather than the item itself. For example, a big box retailer may place two signs, with differing formats, in two different stores to test which sign receives more interest from customers (e.g., using A/B testing). Continuing with this example, with various wearers having agreed to provide biometric information via consent requests according to the methods described herein, the retailer can obtain aggregated dynamic eye features from the wearers to determine that one of the signs receives more interest from customers than the other. Accordingly, the retailer can determine (e.g., using A/B testing or other statistical techniques) that a particular sign with a specific format is more popular than another type of sign with a different format. Additionally or alternatively, the signage associated with the item and the item itself can be used to indicate an intent of an action for an item. In both cases, the set of images associated with the item can be processed by the biometric information exchange system 705 or processing modules 224, 228 to provide offers 820 to a wearer of the wearable display system 710 for biometric information exchanges, as displayed on the display page 800b. For example, as described below with reference to FIG. 9, the processing modules 224, 228 can implement the routine 900 to process biometric information from a set of images including eye images and corresponding outside-world images.

Although the foregoing examples have been described in analyzing the outside-world images of peanut butter jars at a retail store, this is for illustration and is not intended to be limiting. In other implementations, any item can be used in an analysis of obtained eye images. Also any correlation of information obtained from the processing of eye images and outside-world images can be used to infer an intent of an action for an item (e.g., purchasing the item). For example, by correlating the eye focus information and eye movements of wearers in the same retail store with corresponding outside-world images of each wearer, offers 820 can be made to various wearers as information becomes more commonly available. As another example, the exchange rate for a particular type of biometric information may decrease as correlations indicate that such information is not useful, or may increase as correlations indicate that such biometric information is useful. Other factors can also affect the offers 820. For example, if a large number of wearers select a particular offer regarding eye fixations while driving on US-101, the exchange rate may decrease to $5/month, rather than the displayed rate of $99 per month in FIG. 8B. As described further below in FIG. 9, the routine 900 depicts an example workflow for exchanging biometric information, such as displaying a consent request regarding biometric information with a wearable display system 710, obtaining biometric information from a wearer utilizing the wearable display system 710, and/or processing the biometric information to generate a biometric information processing result for a biometric information acquirer computing device 715.

After having opted-in and authorized a connection between the wearable display system 710 and the biometric information exchange system 705, a wearer can change his or her mind and decide to opt-out of the connection to the biometric information exchange system 705. For example, the biometric information exchange system 705 can generate display pages (or links thereto) so that William can withdraw consent and de-associate William's wearable display system 710. After wearer consent is withdrawn, the biometric information exchange system 705 can remove wearer's authentication information (e.g., username and password information), profile information, and any biometric information obtained from any data repository or cache associated with the biometric information exchange system 705.

FIG. 8C illustrates an example display page 800c that generated by a biometric information exchange system 705 for a wearer to provide consent request for receiving offers regarding certain categories of biometric information of the wearer. As illustrated, before even sharing biometric information with biometricexchange.com, a popup is displayed on the display page 800c of FIG. 8C during the process in which a wearer provides consent to the biometric information exchange system 705 to connect to that system. In this illustrative example, William can be presented with a popup 824 that can be displayed over the display page 800c, which requests permission from William to connect his wearable display system 710 to the biometric information exchange system 705 and share certain biometric information. The popup 824 describes the actions the biometric information exchange system 705 can take if William consents to connecting his wearable display system 710 with the biometric information exchange system 705 and shares certain aspects of his biometric information with the biometric information exchange system 705. For example, William can choose certain categories (e.g., eye movements and eye patterns) that can be shared with third-party biometric information acquirers connected to the biometric information exchange system 705. If William decides not to consent, William can click or select the Don't Allow button 812, and the biometric information exchange system 705 may not attempt to connect or link William's wearable display system 710 to the biometric information exchange system 705. In this situation, the wearer's biometric information remains private and unavailable to the biometric information exchange system 705.

If William decides to consent, then William can select the Allow button 808 to indicate an agreement regarding an aspect of biometric information exchange. As illustrated, in this example, William indicates that he agrees to share certain categories of his biometric information for the provision of biometric information exchanges. By selecting the Allow button 808, William has provided a consent indication regarding certain categories of offers for biometric information exchanges, and wearable display system 710 may share such biometric information with biometricexchanage.com. As described above, the popup 824 can also include a description of the biometric information exchange system's policy to protect the privacy of a wearer's personal data and a description of how the wearer can use the Allow button 808 and the Don't Allow button 812 functionalities.

FIG. 8D illustrates an example display page 800d generated by the biometric information exchange system 705 and a corresponding popup that can be displayed on that example display page 800d when a wearer consents to receive offers regarding certain categories of biometric information with the biometric information exchange system 705, as initiated in FIG. 8C. After the connection has been made by biometric information exchange system 705, William may be presented with a popup 828 that indicates the connection has been successfully made. Connections to the biometric information exchange system 705 can be made with the consent received from the popup 828, as was described above with reference to FIG. 8B.

With a successful connection to the biometric information exchange system 705, the display page 800d can display offers 832 for biometric information exchanges. As illustrated, the offers 832 include descriptions of biometric information obtained by the wearable display system 710 for certain biometric exchange rates. As an example offer 832, the eye movements regarding a toothpaste brand at an example BigBoxStore (or any retail establishment or show room, whether online or brick and mortar) can be exchanged with a biometric information acquirer computing device 715 for an exchange rate of a promotional item similar to the toothpaste brand (e.g., a competitor or promotional toothpaste product) for every 10 visits at the BigBoxStore. For example, Adam Acquirer may want to exchange a promotional wearable wrist watch for eye movements of competitor wearable devices during William's visit to the BigBoxStore. As another example offer 832, the eye patterns of William, after driving on US-101 for 90 minutes, can be exchanged for an exchange rate of a free 15-minute drive provided by an example Taxi Company, when William utilizes the wearable display system 710 when driving on US-101. Accordingly, as illustrated in FIGS. 8C-8D, William has consented to share certain categories of biometric information based on the initial consent request from the biometric information exchange system to share William's biometric information. In turn, the biometric information exchange system 705 facilitates the provision of offers for William's biometric information at certain exchange rates, as offered by various biometric information acquirer computing devices 715. As another example not depicted in FIG. 8D, a list of offers associated with behavioral characteristics of the wearer of the wearable display system 710 at respective exchange rates can be presented to William for exchange on the biometric information exchange system 705.

FIG. 8E illustrates an example display page 800e that may be generated by a biometric information exchange system 705 to provide a consent request for sharing some or all biometric information of the wearer. In this illustrative example, William can be presented with a popup 836 that can be displayed over the display page 800e, which requests permission from William to connect his wearable display system 710 to the biometric information exchange system 705 and share all of his biometric information. The popup 836 describes the actions the biometric information exchange system 705 can take if William consents to connecting his wearable display system 710 with the biometric information exchange system 705 and shares any of his biometric information with the biometric information exchange system 705. For example, the wearable display system 710, utilized by William, can share biometric information (e.g., eye movements and eye patterns) with third-party biometric information requires connected to the biometric information exchange system 705. Such biometric information can be utilized by the biometric information exchange system 705 to provide offers by Adam Acquirer to William for any aspect of his biometric information. Accordingly, if William agrees with the textual content associated with the popup 836, William can select the Allow button 808. As described above, the popup 836 can also include a description of the biometric information exchange system's policy to protect the privacy of a wearer's personal data and a description of how the wearer can use the Allow button 808 and the Don't Allow button 812 functionalities.

If, however, William decides not to consent, William can click or select the Don't Allow button 812, and the biometric information exchange system 705 may not attempt to connect or link William's wearable display system 710 to the biometric information exchange system 705. In this situation, the wearer's biometric information remains private and unavailable to the biometric information exchange system 705.

Example Biometric Information Exchange Routine

Figure 9:
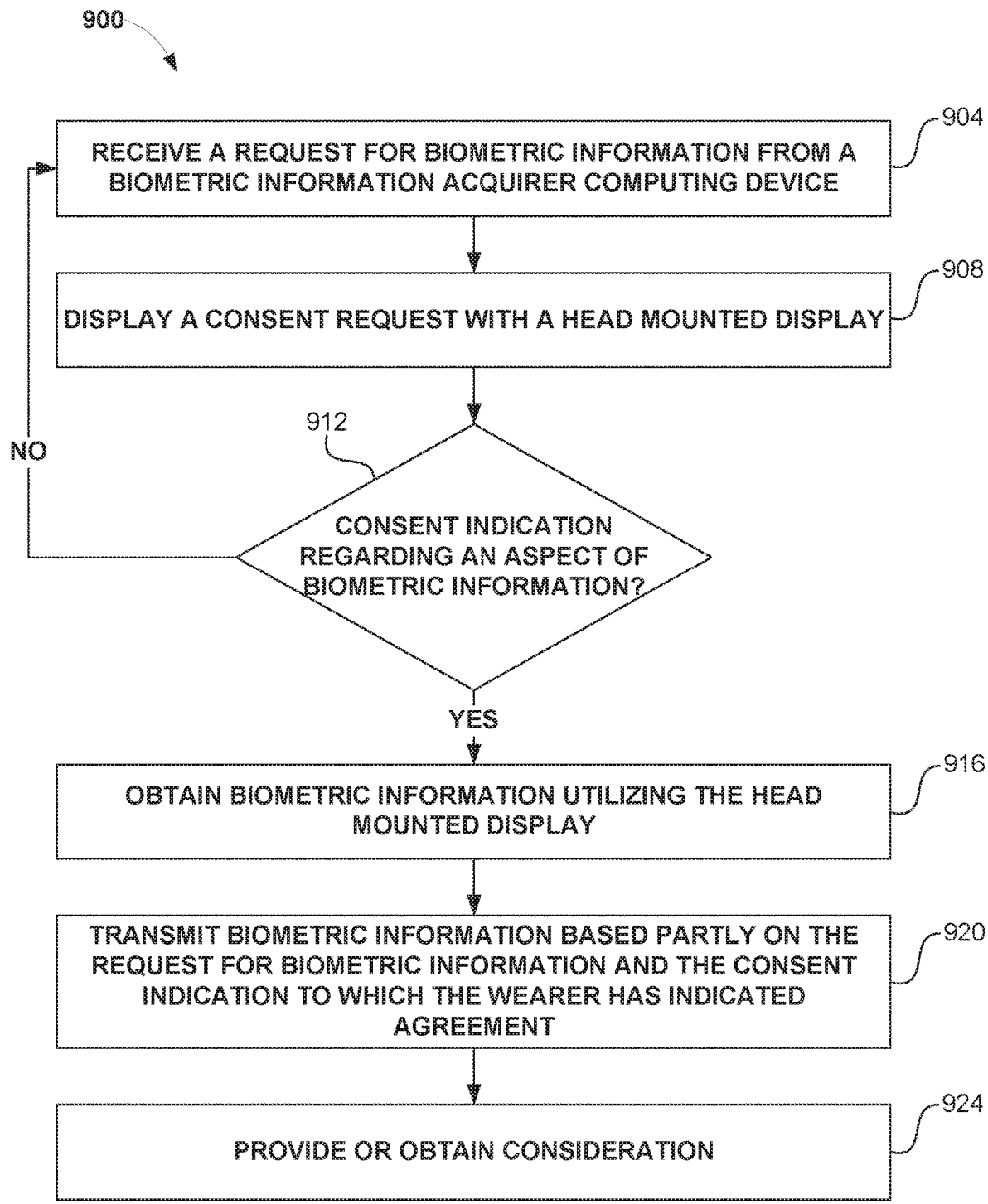
FIG. 9 shows a flow diagram of an illustrative method for exchanging biometric information.

FIG. 9 shows a flow diagram of an illustrative biometric information exchange routine. The routine 900 depicts an example workflow for displaying a consent request regarding biometric information with a wearable display system 710, obtaining biometric information from a wearer utilizing the wearable display system 710, and processing the biometric information to generate a biometric information processing result for a biometric information acquirer computing device 715. The routine 900 can be performed by the biometric information exchange system 705.

At block 904, the request for biometric information is received from a biometric information acquirer computing device 715. The request for the biometric information can be received from a variety of sources including, but not limited to: a server hosting the biometric information exchange system 705, a biometric information acquirer computing device 715 connected directly to the wearable display system 710, a computing device hosting the biometric information exchange system 705, or any computing device associated with a biometric information acquirer computing device 715 and connected to a network to which wearable display system 710 is also connected.

Continuing with the routine 900, at block 908, a consent requests is displayed with a wearable display system 710. As described above, a wearable display system 710 is a type of a wearable display system 710. In various implementations, the consent request can be displayed on a display of the wearable display system 710 as described above with respect to the example of biometric information exchange techniques. For example, the consent request can be displayed in an augmented reality scene on a wearable display system 710, which displays competitor items with an item included in the offer for a biometric information exchange.

At decision block 912, a determination is made regarding whether a consent indication has been received. The consent indication can be regarding an aspect of the biometric information. For example, a consent response can be received in response to the display of the consent request. The consent response can include a consent indication that is associated with an agreement regarding an aspect of biometric information. Illustratively, the consent response can be regarding several categories of biometric information to which a wearer of the wearable display system 710 has agreed to only a portion of those categories. In that case, the consent indication is those agreed-to consent categories. In another aspect, the consent indication can be a catch-all consent to any or all biometric information received, captured, or detected by the wearable display system 710 when utilized by the wearer to which the consent request had been displayed.

In some cases, no consent indication may have been received. For example, a consent indication may not have been received after a certain time period of displaying the consent request. Alternatively or additionally, a consent response may indicate that no consent has been agreed to for any biometric information. For example, a wearer may not have indicated consent to any consent category of biometric information. If the user has not indicated consent to a consent request, the routine 900 proceeds to back to block 904. Additional consent requests can be received and displayed to the wearer iteratively. As but one example, a consent request may not be displayed to a wearer again for a period of time. As another example, a different consent request, narrower in scope, may be displayed to a wearer utilizing the wearable display system 710 at block 908. For example, the narrower scope consent request may be a request for only displaying offers regarding sharing biometric information (in which case, block 920, described below, may not be a part of the routine 900). In any case, the routine 900 can proceed iteratively to decision block 912, until a consent indication regarding an aspect of biometric information has been responded to affirmatively. In some implementations, a consent indication can be determined based on a lack of rejection of a number of consent requests (e.g., 2, 3, 4, 5, 10, or more) shown to the user.

If, at decision block 912, a consent indication has been determined to have been received in a consent response from the wearer, the routine 900 proceeds to block 916. For example, in various implementations, a consent indication regarding an aspect of biometric information can be determined to have been received when an "Allow" indication is received via a display page 800a, 800c, 800e as described above with reference to the examples illustrated in FIGS. 8A, 8C, and 8E.

Continuing with the routine 900, at block 916, biometric information is obtained utilizing the wearable display system 710. As described above, biometric information can be obtained using a variety of devices coupled to the wearable display system 710, such as an image capture device or a galvanic sensor system. Biometric information can include eye images or the result of processing the eye images, such as eye focus information.

At block 920, a portion of the biometric information obtained (or all of it) is transmitted to a biometric information exchange acquirer 715 based on the initial request for biometric information and the consent indication to which the wearer has indicated agreement. For example, in various implementations, a portion of biometric information obtained regarding a category of biometric information can be transmitted to a biometric information exchange acquirer 715 as described above with reference to the example illustrated in FIG. 8D when the wearer has connected to a biometric information exchange system 705 to receive offers for certain aspects of biometric information at various exchange rates proposed by a biometric information exchange acquirer 715. In one implementation, biometric information transmitted is dependent, or based partly on, the initial request from the biometric information acquirer computing device 715 (e.g., the consent request displayed to the wearer) and the consent indication to which the wearer has indicated agreement (e.g., only offers regarding eye patterns for items are displayed to the wearer).

At block 924, consideration for the exchange of biometric information can be provided to the wearer. The consideration can include monetary compensation, discounts or rebates on goods or services, preferences for goods or services (e.g., a preferred tee time at a golf course), or any other type of consideration acceptable to the provider of the biometric information. The consideration can be provided to the provider of the biometric information (e.g., the wearer of the wearable display system 710) or to a designee of the provider. The consideration can be provided by the biometric information exchange, the biometric information acquirer, or a third party.

At block 924, the biometric information exchange can obtain consideration for the biometric exchange services provided. For example, the biometric information exchange may charge the biometric information acquirer a fee for connecting the acquirer with the provider of the biometric information. Thereafter, the routine 900 ends.

In some implementations, optionally or additionally, offers regarding biometric information can be transmitted to the wearable display system 710 based on the transmitted biometric information. For example, as illustrated in FIGS. 8B and 8D, offers 826 and 838 can be transmitted to the wearer by displaying such offers on the display pages 800b, 800d. Routine 900 can provide such offers to a wearer to facilitate exchanges via the biometric information exchange system 705.

In various embodiments, the routine 900 can be performed by a hardware processor (e.g., the processing modules 224, 228 or the controller 450) of a display system such as in the embodiments of the display system 200. In other embodiments, a remote computing device with computer-executable instructions can cause the wearable display system 710 to perform aspects of the routine 900. For example, the remote computing device can determine that the consent indication is regarding an aspect of biometric information (e.g., eye patterns).

In some embodiments, a method is performed under control of a hardware processor and comprises: transmitting a consent request to a user, the request comprising a plurality of consent categories for biometric information of the user, the biometric information including physiological information, behavioral information, or any combination thereof; receiving a response to the consent request; determining that the response includes a consent indication from the user, the consent indication regarding a consent category that the user has indicated agreement; obtaining a plurality of eye images of the user; and in response to a request for biometric information from a biometric information acquirer computing device, transmitting the plurality of eye images, to the biometric information acquirer computing device, based at least partly on the consent category that the user has indicated agreement and the request for biometric information.

In some embodiments, a method is performed under control of a hardware processor and comprises: cause to display a consent request regarding biometric information of a user; determining that a response to the consent request includes a consent indication regarding an aspect of the biometric information; obtaining a biometric information processing result processed from the biometric information; and providing a biometric information acquirer computing device associated with the consent indication with the biometric information processing result.

In some embodiments, a method is performed under control of a hardware processor and comprises: receiving an indication of consent by a wearer of a head mounted display to exchange of a category of biometric information obtainable from the wearer of the head mounted display with a biometric information acquirer; obtaining the biometric information of the wearer of the head mounted display; and transmitting biometric exchange data associated with the obtained biometric information to the biometric information acquirer.

Additional Aspects

In a 1st aspect, a head mounted display system is disclosed. The head mounted display comprises: a first image capture device configured to capture a plurality of eye images of an eye; a second image capture device configured to capture a plurality of outside-world images; a display configured to display virtual images to the eye of a wearer of the head mounted display; a hardware processor programmed to: communicate a consent request to the wearer of the head mounted display, the request comprising a plurality of consent categories for biometric information of the wearer; receive a response to the consent request; determine that the response includes a consent indication from the wearer of the head mounted display, the consent indication regarding a consent category that the wearer has indicated agreement; obtain the plurality of eye images of the wearer of the head mounted display captured by the first image capture device; and in response to a request for biometric information from a biometric information acquirer computing device, transmit the plurality of eye images, to the biometric information acquirer computing device, based at least partly on the consent category that the wearer has indicated agreement and the request for biometric information.

In a 2nd aspect, the head mounted display system of aspect 1, wherein the plurality of consent categories for biometric information of the wearer comprises at least one of an offer category, a partial sharing category, a complete sharing category, or any combination thereof.

In a 3rd aspect, the head mounted display system of aspect 2, wherein the consent category that the wearer has indicated agreement corresponds to the complete sharing category.

In a 4th aspect, the head mounted display system of any one of aspects 2-3, wherein the partial sharing category includes sharing of the plurality of eye images regarding an item brand or an item product in a retail store.

In a 5th aspect, the head mounted display system of any one of aspects 1-4, wherein the hardware processor is further programmed to: perform a biometric data operation on the plurality of eye images to obtain biometric information, and wherein to transmit the plurality of eye images in response to the request for biometric information form the biometric information acquirer computing device, the hardware processor is further programmed to: in response to the request for biometric information from the biometric information acquirer computing device, transmit a portion of the biometric information obtained based at least partly on the consent category that the wearer has indicated agreement.

In a 6th aspect, the head mounted display system of aspect 5, wherein the biometric information corresponds to at least one of eye patterns, eye movements, eye fixations, or eye browsing history.

In a 7th aspect, the head mounted display system of any one of aspects 5-6, wherein to perform the biometric data operation on the plurality of eye images to obtain biometric information, the hardware processor is further programmed to: perform a pose estimation or iris code generation using the plurality of eye images.

In a 8th aspect, the head mounted display system of any one of aspects 1-7, wherein the hardware processor is further programmed to: display the consent request utilizing the head mounted display system.

In a 9th aspect, the head mounted display system of any one of aspects 1-8, wherein the hardware processor is further programmed to: in response to receiving the response to the consent request, display a plurality of biometric exchange offers utilizing the head mounted display, wherein the plurality of biometric exchange offers comprises offers associated with biometric information regarding items from an electronic catalog or biometric information based on a location of the wearer of the head mounted display system.

In a 10th aspect, the head mounted display system of aspect 9, wherein the hardware processor is further programmed to: filter the plurality of biometric exchange offers based on a threshold exchange rate.

In a 11th aspect, the head mounted display system of any one of aspects 9-10, wherein the hardware processor is further programmed to: filter the plurality of biometric exchange offers based on an exclusion of an aspect of biometric information, wherein the exclusion is specified by the wearer of the head mounted display system.

In a 12th aspect, the head mounted display system of any one of aspects 1-11, wherein the hardware processor is further programmed to: filter the plurality of biometric exchange offers based on an inclusion of an aspect of an offer, wherein the inclusion is specified by the wearer of the head mounted display system.

In a 13th aspect, the head mounted display system of any one of aspects 1-12, wherein the hardware processor is further programmed to: form a secure connection between the head mounted display system and the biometric information acquirer computing device.

In a 14th aspect, the head mounted display system of any one of aspects 1-13, wherein the hardware processor is further programmed to: process the plurality of eye images captured by the first image capture device and the plurality outside-world images captured by the second image capture device to obtain a behavioral characteristic regarding the wearer of the head mounted display system.

In a 15th aspect, the head mounted display system of aspect 14, wherein the behavioral characteristic regarding the wear comprises an item brand or an item product in a retail store looked at by the eye of the wearer in the plurality of eye images determined using the plurality of outside-world images.

In a 16th aspect, the head mounted display system of any one of aspects 14-15, wherein the hardware processor is further programmed to: display a second consent request regarding the obtained behavioral characteristic utilizing the head mounted display system.

In a 17th aspect, the head mounted display system of aspect 16, wherein the hardware processor is further programmed to: in response to receiving the response to the second consent request regarding the obtained behavioral characteristic, display a second plurality of biometric exchange offers utilizing the head mounted display, wherein the second plurality of biometric exchange offers comprises offers associated with biometric information regarding items from an electronic catalog, offers associated with biometric information based on a location of the wearer of the head mounted display system, offers associated with behavioral characteristics of the wearer of the head mounted display system, or any combination thereof.

In a 18th aspect, the head mounted display system of any one of aspects 1-17, wherein the display is configured to display the consent request to the wearer of the head mounted display, and wherein to communicate the consent request to the wearer, the hardware processor is configured to display the consent request to the wearer using the display.

In a 19th aspect, the head mounted display system of any one of aspects 1-18, wherein the display is configured to present a plurality of depth planes to the wearer.

In a 20th aspect, the head mounted display system of any one of aspects 1-19, wherein the display is configured to present a light field image to the wearer.

In a 21st aspect, the head mounted display system of any one of aspects 1-20, wherein the display comprises a plurality of stacked waveguides.

In a 22nd aspect, a method for obtaining biometric information is disclosed. The method is under control of a processor and comprises: transmitting a consent request to a user, the request comprising a plurality of consent categories for biometric information of the user, the biometric information including physiological information, behavioral information, or any combination thereof; receiving a response to the consent request; determining that the response includes a consent indication from the user, the consent indication regarding a consent category that the user has indicated agreement; obtaining a plurality of eye images of the user; and in response to a request for biometric information from a biometric information acquirer computing device, transmitting the plurality of eye images, to the biometric information acquirer computing device, based at least partly on the consent category that the user has indicated agreement and the request for biometric information.

In a 23rd aspect, the method of aspect 22, wherein the plurality of consent categories for biometric information of the user comprises at least one of an offer category, a partial sharing category, and a complete sharing category.

In a 24th aspect, the method of aspect 23, wherein the consent category that the user has indicated agreement corresponds to the partial sharing category.

In a 25th aspect, the method of any of aspects 23-24, wherein the partial sharing category includes sharing of the plurality of eye images regarding a signage associated with an item from an electronic catalog.

In a 26th aspect, the method of any of one aspects 22-25, further comprising: performing a biometric data operation on the plurality of eye images to obtain biometric information; and in response to the request for biometric information from a biometric information acquirer computing device, transmitting a portion of the biometric information based at least partly on the consent category that the user has indicated agreement.

In a 27th aspect, the method of aspect 26, wherein the biometric information corresponds to at least one of eye patterns, eye movements, eye fixations, or eye browsing history.

In a 28th aspect, the method of any one of aspects 22-27, wherein performing the biometric data operation on the plurality of eye images to obtain biometric information comprises performing a pose estimation or iris code generation for the plurality of eye images.

In a 29th aspect, the method of any one of aspects 22-28, further comprising: displaying the consent request utilizing a head mounted display.

In a 30th aspect, the method of any one of aspects 22-29, further comprising: in response to receiving the response to the consent request, displaying a plurality of biometric exchange offers utilizing the head mounted display, wherein the plurality of biometric exchange offers comprises offers associated with biometric information regarding items from an electronic catalog or biometric information based on a location of the user.

In a 31st aspect, the method of any one of aspects 22-30, further comprising: filtering the plurality of biometric exchange offers based on a filter condition.

In a 32nd aspect, the method of any one of aspects 22-31, further comprising: receiving outside-world images from a second imaging system coupled to the head mounted display.

In a 33rd aspect, the method of aspect 32, further comprising process the plurality of eye images and the plurality outside-world images captured by the second image to obtain a behavioral characteristic regarding the user.

In a 34th aspect, the method of aspect 33, wherein the behavioral characteristic regarding the user comprises the user looking at a signage associated with an item from an electronic catalog.

In a 35th aspect, a method for exchanging biometric information is disclosed. The method is under control of a processor and comprises: cause to display a consent request regarding biometric information of a user; determining that a response to the consent request includes a consent indication regarding an aspect of the biometric information; obtaining a biometric information processing result processed from the biometric information; and providing a biometric information acquirer computing device associated with the consent indication with the biometric information processing result.

In a 36th aspect, the method of aspect 35, wherein the consent request comprises a request to provide offers regarding the biometric information.

In a 37th aspect, the method of any one of aspects 35-36, wherein the consent request comprises a plurality of consent categories regarding the biometric information.

In a 38th aspect, the method of any one of aspects 35-37, wherein the consent request comprises a sharing request for any biometric information.

In a 39th aspect, the method of any one of aspects 35-38, further comprising: receiving a request for biometric information from the biometric information acquirer computing device.

In a 40th aspect, the method of any one of aspects 35-39, wherein determining that the response to the consent request includes the consent indication regarding the aspect of the biometric information comprises determining that the consent indication includes agreement to sharing an aspect of the biometric information.

In a 41st aspect, the method of any one of aspects 35-40, further comprising: receiving the consent request regarding biometric information from a biometric information acquirer computing device.

In a 42nd aspect, the method of any one of aspects 35-41, wherein determining that the response to the consent request includes the consent indication regarding an aspect of the biometric information comprises determining that the consent indication has been received from a selectable item on a display page, wherein the selectable item is associated with textual content including a portion of the consent request.

In a 43rd aspect, a method for exchanging biometric information is disclosed. The method is under control of a processor and comprises: receiving an indication of consent by a wearer of a head mounted display to exchange of a category of biometric information obtainable from the wearer of the head mounted display with a biometric information acquirer; obtaining the biometric information of the wearer of the head mounted display; and transmitting biometric exchange data associated with the obtained biometric information to the biometric information acquirer.

In a 44th aspect, the method of aspect 43, wherein the biometric information includes physiological information, behavioral information, or any combination thereof.

In a 45th aspect, the method of any one of aspects 43-44, further comprising providing consideration to the wearer of the head mounted display or a designee of the wearer of the head mounted display.

In a 46th aspect, the method of any one of aspects 43-45, further comprising receiving consideration from the biometric information acquirer or a designee of the biometric information acquirer.

In a 47th aspect, the method of any one of aspects 43-46, further comprising processing the obtained biometric information to determine the biometric exchange data.

In a 48th aspect, the method of aspect 47, where processing the obtained biometric information comprises receiving processing instructions from the biometric information acquirer.

CONCLUSION

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A head mounted display system comprising:
   an image capture device configured to capture eye images of an eye;
   a display configured to display virtual images to the eye of a wearer of the head mounted display; and
   a hardware processor programmed to:
      obtain the eye images of the wearer captured by the image capture device;
      determine biometric information of the wearer based at least in part on the eye images, wherein the biometric information is associated with physiological or behavior characteristics of the wearer;
      detect initiation of a first action being performed by the wearer based at least in part on the biometric information, wherein the first action is defined by a biometric information acquirer;
      based at least in part on the detected first action and while the wearer is performing the first action, communicate a consent request to the wearer, the request comprising a plurality of consent categories for biometric information, wherein the plurality of consent categories includes a first consent category and a second consent category;
      receive a response to the consent request, wherein the response includes a consent indication from the wearer;
      detect termination of the first action based at least in part on the biometric information, wherein performance of the first action occurs over a length of time starting at a first time of the detected initiation of the first action and ending at a second time of the detected termination of the first action;
      in response to a determination that the consent indication indicates that the wearer has not agreed to the first consent category:
         in response to a first request for biometric information from the biometric information acquirer computing device, suppress transmission of biometric information that is (1) associated with the first consent category, and (2) determined based on the eye images obtained during performance of the first action; and in response to a determination that the consent indication indicates that the wearer has agreed to the second consent category:

in response to a second request for biometric information from the biometric information acquirer computing device, transmit, to the biometric information acquirer computing device, biometric information that is (1) associated with the second consent category, and (2) determined based on the eye images obtained during performance of the first action, while suppressing transmission of biometric information that is (1) associated with the second consent category, and (2) determined based on the eye images obtained before initiation or after termination of the first action.

2. The head mounted display system of claim 1, wherein the plurality of consent categories comprises at least one of: an offer category, a partial sharing category, or a complete sharing category.

3. The head mounted display system of claim 1, wherein the hardware processor is further programmed to:

display the consent request utilizing the head mounted display system.

4. The head mounted display system of claim 1, wherein the hardware processor is further programmed to:

in response to receiving the response to the consent request, display a plurality of biometric exchange offers utilizing the head mounted display, wherein the plurality of biometric exchange offers comprises offers associated with biometric information regarding items from an electronic catalog or biometric information based on a location of the wearer.

5. The head mounted display system of claim 4, wherein the hardware processor is further programmed to:

filter the plurality of biometric exchange offers based on a threshold exchange rate.

6. The head mounted display system of claim 4, wherein the hardware processor is further programmed to:

filter the plurality of biometric exchange offers based on an exclusion of an aspect of biometric information, wherein the exclusion is specified by the wearer.

7. The head mounted display system of claim 4, wherein the hardware processor is further programmed to:

filter the plurality of biometric exchange offers based on an inclusion of an aspect of an offer, wherein the inclusion is specified by the wearer.

8. The head mounted display system of claim 1, wherein the hardware processor is further programmed to:

form a secure connection between the head mounted display system and the biometric information acquirer computing device.

9. The head mounted display system of claim 1, wherein the hardware processor is further programmed to:

process the eye images captured by the first image capture device and the plurality outside-world images captured by the second image capture device to obtain a behavioral characteristic regarding the wearer.

10. The head mounted display system of claim 9, wherein the hardware processor is further programmed to:

display a second consent request regarding the obtained behavioral characteristic utilizing the head mounted display system.

11. The head mounted display system of claim 1, wherein the display is configured to display the consent request to the wearer, and wherein to communicate the consent request to the wearer, the hardware processor is configured to display the consent request to the wearer using the display.

12. The head mounted display system of claim 1, wherein the display is configured to present a plurality of depth planes to the wearer or to present a light field image to the wearer.

13. The head mounted display system of claim 1, wherein the display comprises a plurality of stacked waveguides.

14. A head mounted display system comprising:

an image capture device configured to capture eye images of an eye;

a display configured to display virtual images to the eye of a wearer of the head mounted display; and a hardware processor programmed to:

obtain the eye images of the wearer captured by the image capture device;

determine biometric information of the wearer based at least in part on the eye images, wherein the biometric information is associated with physiological or behavior characteristics of the wearer;

detect initiation of a first action being performed by the wearer based at least in part on the biometric information, wherein the first action is defined by a biometric information acquirer;

based at least in part on the detected first action and while the wearer is performing the first action, communicate a consent request to the wearer, the request comprising a plurality of consent categories for biometric information, wherein the plurality of consent categories includes a first consent category and a second consent category;

receive a response to the consent request, wherein the response includes a consent indication from the wearer;

detect termination of the first action based at least in part on the biometric information, wherein performance of the first action occurs over a length of time starting at a first time of the detected initiation of the first action and ending at a second time of the detected termination of the first action;

in response to a determination that the consent indication indicates that the wearer has not agreed to the first consent category:

in response to a first request for biometric information from the biometric information acquirer computing device, suppress transmission of biometric information that is (1) associated with the first consent category, and (2) determined based on the eye images obtained during performance of the first action; and in response to a determination that the consent indication indicates that the wearer has agreed to the second consent category:

in response to a second request for biometric information from the biometric information acquirer computing device, transmit, to the biometric information acquirer computing device, biometric information that is (1) associated with the second consent category, and (2) determined based on the eye images obtained during performance of the first action, while suppressing transmission of biometric information that is (1) associated with the second consent category, and (2) determined based on the eye images obtained before initiation or after termination of the first action.

15. The head mounted display system of claim 1, wherein the performance of the first action is based at least in part on one or more of: a preconfigured time, a preconfigured time period, a location, or multiple locations.

16. The head mounted display system of claim 1, wherein the consent request is a popup window on a user interface displayed to the wearer blocking at least a portion of a display screen.

17. The head mounted display system of claim 14, wherein the performance of the first action is based at least in part on one or more of: a preconfigured time, a preconfigured time period, a location, or multiple locations.

18. The head mounted display system of claim 14, wherein the consent request is a popup window on a user interface displayed to the wearer blocking at least a portion of a display screen.

19. The system of claim 1, wherein the plurality of consent categories for biometric information associated with the consent request is based at least in part on the obtained eye images of the wearer.

20. The system of claim 14, wherein the plurality of consent categories for biometric information associated with the consent request is based at least in part on the obtained eye images of the wearer.

* * * * *